United States Patent
Thunot et al.

(10) Patent No.: US 11,881,799 B2
(45) Date of Patent: Jan. 23, 2024

(54) MOTOR UNIT AND PERSONAL CARE DEVICE COMPRISING A MOTOR UNIT

(71) Applicant: Braun GmbH, Kronberg (DE)

(72) Inventors: Andre Thunot, Frankfurt (DE); Torsten Klemm, Eschborn (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 17/890,442

(22) Filed: Aug. 18, 2022

(65) Prior Publication Data

US 2023/0066642 A1 Mar. 2, 2023

(30) Foreign Application Priority Data

Sep. 1, 2021 (EP) ..................................... 21194424

(51) Int. Cl.
*H02K 33/00* (2006.01)
*H02P 1/00* (2006.01)
(Continued)

(52) U.S. Cl.
CPC .......... *H02P 25/032* (2016.02); *A61C 17/221* (2013.01); *H02P 6/085* (2013.01);
(Continued)

(58) Field of Classification Search
CPC ........ H02P 25/032; H02P 27/08; H02P 6/182; H02P 6/085; A61C 17/221
(Continued)

(56) References Cited

U.S. PATENT DOCUMENTS 4,644,188 A * 2/1987 Grib .......................... H03B 5/30
327/78
5,019,764 A 5/1991 Chang
(Continued)

FOREIGN PATENT DOCUMENTS

CN 102680788 A 9/2012
CN 106357190 A 1/2017
(Continued)

OTHER PUBLICATIONS

Extended EP Search Report and Written Opinion for 21194424.4 dated Feb. 2, 2022, 08 pages.
(Continued)

*Primary Examiner* — Erick D Glass
(74) *Attorney, Agent, or Firm* — Gregory S. Darley-Emerson

(57) ABSTRACT

A motor unit having a motor having a stator and an armature, the armature being arranged for relative driven motion with respect to the stator. A motor control unit has a supply circuit for providing a supply voltage at the motor to provide a set power level to the motor for driving the armature into motion. A measurement circuit is measuring a value of a physical variable indicative of a current flow through the motor, The motor control unit is arranged to interrupt the provision of the supply voltage by the supply circuit and to dynamically brake the motor during a braking time interval and further to measure the value of the physical variable during the braking time interval. The motor control unit is further arranged to compare the measured value of the physical variable with a target value that depends on the supplied power level and on an intended motion amplitude of the armature, to determine a new set power level in dependence on the comparison result and to subsequently provide the new set power level to the motor.

15 Claims, 15 Drawing Sheets

(51) Int. Cl.

| | | |
|---|---|---|
| *H02P 3/00* | (2006.01) | |
| *H02P 5/00* | (2016.01) | |
| *H02P 25/032* | (2016.01) | |
| *A61C 17/22* | (2006.01) | |
| *H02P 6/08* | (2016.01) | |
| *H02P 6/182* | (2016.01) | |
| *H02P 27/08* | (2006.01) | |
| *A61C 17/34* | (2006.01) | |

(52) U.S. Cl.
 CPC .............. *H02P 6/182* (2013.01); *H02P 27/08* (2013.01); *A61C 17/34* (2013.01)

(58) Field of Classification Search
 USPC ........................................................ 318/119
 See application file for complete search history.

(56) References Cited

U.S. PATENT DOCUMENTS

| | | | |
|---|---|---|---|
| 5,361,022 A * | 11/1994 | Brown ................ | H02P 3/12 318/375 |
| 5,883,478 A | 3/1999 | Thesling | |
| 6,373,207 B1 * | 4/2002 | Yablonovitch ........... | H02P 3/12 318/362 |
| 7,307,397 B2 | 12/2007 | Izumi et al. | |
| 9,628,014 B2 | 4/2017 | Klemm et al. | |
| 10,058,408 B2 | 8/2018 | Klemm et al. | |
| 10,463,461 B2 | 11/2019 | Klemm et al. | |
| 2001/0008355 A1 | 7/2001 | Gokturk et al. | |
| 2001/0012915 A1 | 8/2001 | Avrin et al. | |
| 2003/0019937 A1 | 1/2003 | Colley et al. | |
| 2006/0175909 A1 | 8/2006 | Kraus | |
| 2006/0214611 A1 | 9/2006 | Wang et al. | |
| 2009/0243519 A1 | 10/2009 | Izumi et al. | |
| 2010/0281636 A1 | 11/2010 | Ortins et al. | |
| 2011/0005015 A1 | 1/2011 | Iwahori et al. | |
| 2012/0171657 A1 | 7/2012 | Ortins et al. | |

FOREIGN PATENT DOCUMENTS

| | | |
|---|---|---|
| DE | 10242094 A1 | 4/2004 |
| EP | 1063760 A2 | 12/2000 |
| EP | 2961059 A1 | 12/2015 |
| JP | S54133267 A | 10/1979 |
| JP | 2003153517 A | 5/2003 |
| JP | 2006034082 A | 2/2006 |
| JP | 2008131730 A | 6/2008 |
| JP | 2009215756 A | 9/2009 |
| JP | 2010509023 A | 3/2010 |
| JP | 2011155817 A | 8/2011 |
| JP | 2011176942 A | 9/2011 |
| JP | 2011176997 A | 9/2011 |
| WO | 2004020161 A1 | 3/2004 |
| WO | 2004034561 A1 | 4/2004 |
| WO | 2008060482 A2 | 5/2008 |
| WO | 2014016718 A1 | 1/2014 |

OTHER PUBLICATIONS

PCT Search Report and Written Opinion for PCT/IB2022/058169 dated Dec. 14, 2022, 13 pages.
All Office Actions: U.S. Appl. No. 16/045,991, filed Jul. 26, 2018.
All Office Actions: U.S. Appl. No. 14/749,557, filed Jun. 24, 2015.
All Office Actions: U.S. Appl. No. 15/461,422, filed Mar. 16, 2017.

* cited by examiner

MOTOR UNIT AND PERSONAL CARE DEVICE COMPRISING A MOTOR UNIT

FIELD OF THE INVENTION

The present application is concerned with a motor unit comprising a motor that is driven by supplying a set power level to the motor and where a motor control unit is arranged to control the subsequent power supply of the motor based on a measured value of a physical variable. The present application is also concerned with a personal care device and with a method of controlling a motor unit.

BACKGROUND OF THE INVENTION

It is known that the power needed by an oscillating motor to achieve a constant oscillation amplitude or speed varies with a load applied at the motor. Without a proper control of the power level supplied to the motor, the amplitude or speed of an oscillating motor will drop with increasing load. One way of measuring the amplitude or speed of the motor is to directly determine the so-called back electromagnetic force (back EMF) at a motor coil, i.e., the voltage induced in the motor coil by the relative motion between the motor coil (e.g., provided at the stator of the motor) and a permanent magnet (e.g., provided at a moving part of the motor). If the amplitude drops, the speed of the motor drops and thus the back EMF is reduced.

To enable a direct measurement of the back EMF at the motor coil, the drive current flowing through the motor coil is typically reduced to zero to avoid other voltages that would disturb the measurement of the back EMF. That means that once the provision of supply voltage at the motor is stopped, the drive current flowing through the motor coil must first be dissipated before the back EMF can be measured. If a drop of the back EMF is determined, more energy is to be subsequently applied at the motor per period (i.e., a higher power level needs to be provided) to maintain a constant motor amplitude. Document EP 1 063 760 B1 generally discusses such a control method. This solution requires a lengthy interruption in the driving of the motor during which energy in the motor must be dissipated and thus causes a reduction in motor efficiency.

Instead of determining the back EMF at the motor coil itself, it had been proposed to use a secondary measurement coil to determine the velocity of the moving permanent magnet of the oscillating motor, but such a solution requires additional parts and thus increases the costs of the motor.

The present disclosure provides a motor unit that is arranged to control a motor, preferably a brushless motor, in a manner that principally allows maintaining a constant motor amplitude or speed and that is improved over the known motor units or that at least provides a different motor control. It is also an object of the present disclosure to provide a method of controlling a motor unit so that a constant motor amplitude can principally be maintained, which method is improved over the known methods or represents at least a different method. Preferably, the motor unit and relating control method provides for a higher motor efficiency than the known motor units/control methods.

SUMMARY OF THE INVENTION

In accordance with one aspect, a motor unit is provided comprising a motor having a stator and an armature, the armature being arranged for relative driven motion with respect to the stator, and a motor control unit having a supply circuit for providing a supply voltage at the motor to provide a set power level to the motor for driving the armature into motion, and a measurement circuit for measuring a value of a physical variable that is indicative of a current flow through the motor, wherein the motor control unit is arranged to interrupt the provision of the supply voltage by the supply circuit and to dynamically brake the motor during a braking time interval and further to measure the value of the physical variable during the braking time interval, wherein the motor control unit is further arranged to compare the measured value of the physical variable with a target value, which target value depends on the supplied power level and on an intended motion amplitude of the armature, to determine a new set power level in dependence on the comparison result and to subsequently provide the new set power level to the motor.

In accordance with one aspect, a personal care device comprises a motor unit as discussed above.

In accordance with one aspect, a method of controlling a motor unit, preferably a motor unit of a personal care device, comprises the steps of:
providing a motor having a stator and an armature arranged for relative driven motion with respect to the stator,
supplying a set power level at the motor to drive the armature into motion, preferably by supplying a pulse-width modulated supply voltage at the motor,
dynamically braking the motor during a braking time interval,
measuring a value of a physical variable indicative of a current flow through the motor during the braking time interval,
comparing the value of the physical variable with a target value, which target value depends on the set power level and an intended amplitude of the motion of the armature,
determining a new set power level in dependence on the comparison result, and
subsequently providing the new set power level to the motor.

BRIEF DESCRIPTION OF THE DRAWINGS

The present disclosure will be further elucidated by a detailed description of example embodiments and with reference to figures.

DETAILED DESCRIPTION OF THE INVENTION

Figure 1:
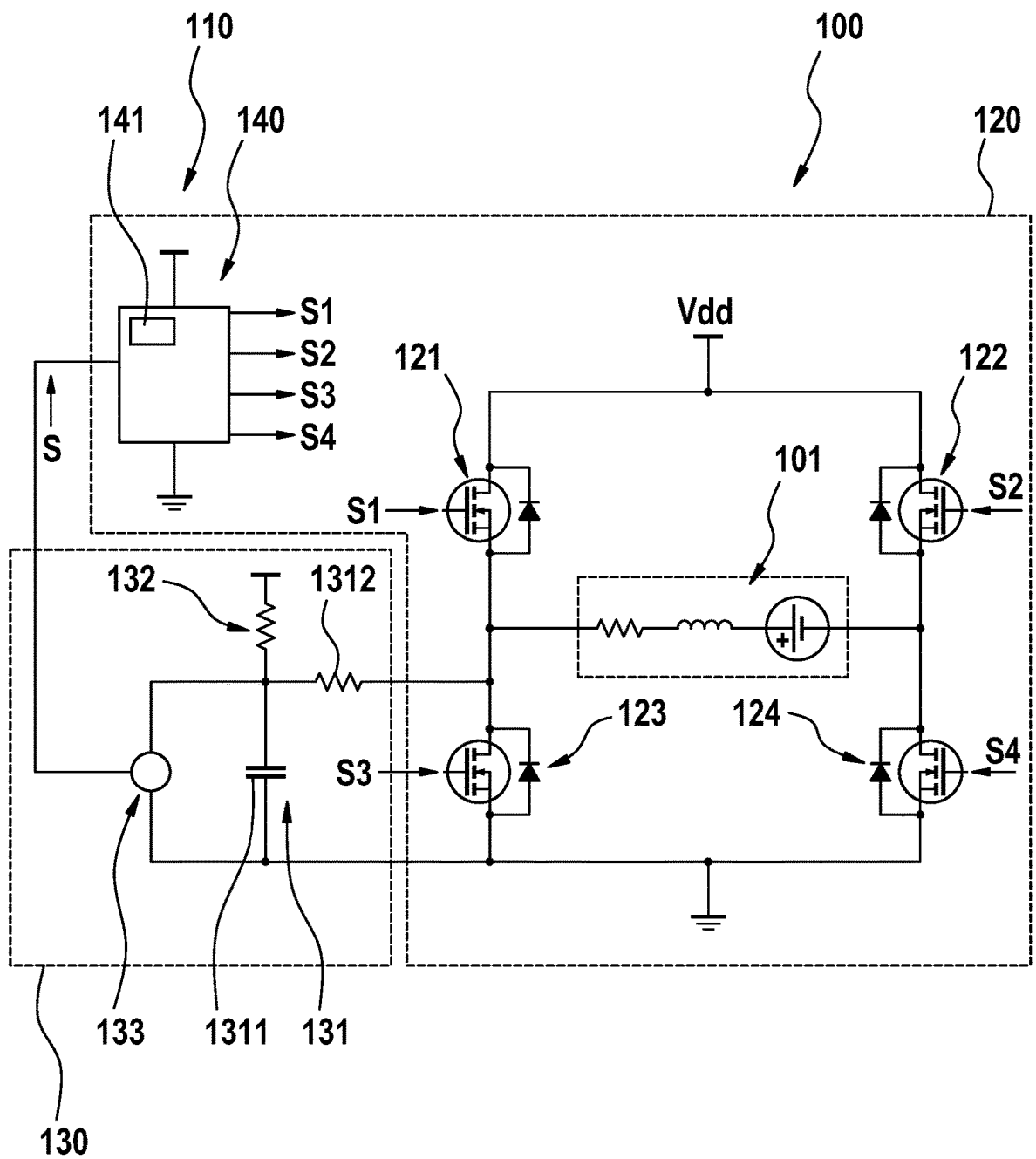
FIG. 1 is a depiction of elements of an example motor unit comprising a motor, an H-bridge for applying a commuted DC voltage at the motor and a motor control unit for controlling the H-bridge.

In the context of the present description, "personal care" shall mean the nurture (or care) of the skin and of its adnexa (i.e., hairs and nails) and of the teeth and the oral cavity (including the tongue, the gums etc.), where the aim is on the one hand the prevention of illnesses and the maintenance and strengthening of health and on the other hand the cosmetic treatment and improvement of the appearance of the skin and its adnexa. It shall include the maintenance and strengthening of wellbeing. This includes skin care, hair care, and oral care, as well as nail care. This further includes grooming activities such as beard care, shaving, and depilation.

A "personal care device" thus means any device for performing such nurturing or grooming activity, e.g., (cosmetic) skin treatment devices such as skin massage devices or skin brushes, wet razors, electric shavers or trimmers, electric epilators, and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas. In the present description, an electric toothbrush was chosen to present details of the proposed personal care device. To the extent in which the details are not specific for an electric toothbrush, the proposed technology can be used in any other personal care device.

The term "dynamic braking" used herein refers to a control state of the motor in which the terminals of the motor are connected to each other, e.g., via two switches of an H-bridge, and the current in the motor re-circulates through the motor and dissipates at any resistances present in the re-circulation circuit (e.g., the resistance of the motor coil and the resistances of the switches of the H-bridge). In the dynamic braking interval, the motor is used as a generator and continues to drive the armature. In the herein discussed embodiments, the dynamic braking interval does not comprise a regenerative aspect, i.e., the energy stored in the motor is not fed into an energy source, as the non-regenerative braking has a higher energy efficiency then the regenerative braking. This shall not exclude that the herein discussed concept may be combined with a regenerative braking.

A motor in the present disclosure comprises a stator and a rotor or an armature as moving motor portion, where the term rotor may be typically used for cases where the moving motor portion performs an oscillating rotation, and the term armature may be typically used for cases where the moving motor portion performs a reciprocating linear motion. For sake of simplicity, only the term "armature" will be used in the following. The motor in the present disclosure is thus typically an oscillating motor. An oscillating motor has a resonance frequency at which the input energy (represented by the supplied power level) is most efficiently converted into motor amplitude and thus such a motor is regularly driven with a typically fixed drive frequency at or close to its resonance frequency.

Applying a load at the motor adds damping and shifts the resonance frequency so that the motor amplitude drops when a load is applied. Here, "motor amplitude" means either the peak amplitude provided by a linearly reciprocating armature or the peak angular deflection of an oscillatory rotating rotor (see a more detailed discussion further below). It may be desirable to maintain or at least approximately maintain the motor amplitude despite a varying applied load for improved consumer experience as a user may not appreciate a varying amplitude of the motor that results in a varying amplitude of a driven part (e.g., a movable head part of a personal care device).

It may thus be desirable to measure the momentary motor amplitude or to determine a value of a physical variable that is indicative of the motor amplitude to regulate, e.g., the supplied power level so that the motor amplitude stays constant or is at least kept closer to a constant amplitude level than without the regulation. This means that the variation in the applied load may be faster than the regulation loop or that the regulation process may on purpose respond to load changes with only incremental or partial adaptations of the set power level to avoid a jittering or generally an unstable behavior of the motor amplitude. Constancy of the motor amplitude may thus be achieved only approximately or with some delay.

Due to the structure of an oscillating motor comprising at least one permanent magnet and a coil that in operation move relative to each other at a fixed driving frequency, the voltage induced in the coil by the permanent magnet, which is also known as the back electromagnetic force (or: back-EMF or BEMF), provides a signal that is indicative of the motor amplitude (or the motor linear or rotational speed). Thus, determining a signal being indicative of the back electromagnetic force for allowing to infer the back electromagnetic force from the signal or to establish an indirect correlation with the BEMF from the signal provides a measure of the current motor amplitude and hence provides a basis for controlling the motor amplitude.

The motor control unit thus comprises a measurement circuit for determining such signal, which signal is the value of a physical variable that is indicative of the current flowing through the motor within a dynamic braking interval. It will be discussed in detail further below how the measurement of a value of the physical variable that is indicative of the current flow through the motor allows to derive insights about the back electromagnetic force.

The motor amplitude is typically given by the peak-to-peak value of a linear reciprocation of a motor shaft or by the peak-to-peak deflection angle of an oscillatory rotation of the motor shaft. Instead of the peak-to-peak amplitude one may also refer to the peak amplitude, which is understood to be the semi-amplitude, i.e., half of the peak-to-peak amplitude. Maintaining the peak-to-peak amplitude implies maintaining the peak amplitude in the present disclosure. When a load is applied at the oscillating motor, the motor amplitude becomes reduced as was already mentioned. As the frequency of the oscillatory motion of the motor is fixed by the driving frequency utilized by the motor control, a reduced amplitude means a reduction of the armature speed.

As was mentioned, the speed of the armature can be directly determined by measuring the back-EMF (i.e., the induced voltage in the stator coil of the motor due to the moving permanent magnet(s) attached to the armature), but the back-EMF can only be directly measured if the current driven through the motor is reduced to zero for a certain time period as then the voltage at the motor due to the motor resistance, $U_R = R \cdot I(t)$, is zero and the self-induced voltage at the motor due to the change in the motor current, $U_L = L \cdot (dI(t)/dt)$, becomes zero as well.

If the motor control does not inherently provide for sufficiently long-time intervals during which the motor current becomes zero, the power supply of motor needs to be interrupted and the energy stored in the motor coil needs to be dissipated or fed back into the battery in order to create a situation in which the back-EMF can be directly measured. This allows determining the present motor amplitude and defining whether the set power level provided to the motor should be increased or decreased to maintain a constant motor amplitude. As this is energetically inefficient, a motor control method and respective motor unit that is energetically more efficient is herein proposed, i.e., a method or motor unit that does not require to reduce the motor current to zero to determine the back-EMF/motor amplitude.

One motor control method to determine the motor amplitude was discussed in US 2005/0146296 A1, where in a motor control phase in which voltage was applied at the motor and a current was driven through the motor, at least two current values were measured allowing to determine the motor speed (and thus the motor amplitude). In US 2005/0146296 A1, a single long voltage pulse was applied per half period of the periodic driving of the motor and the current driven through the motor was only rather coarsely approximating a sinusoidal shape.

In contrast, the motor control concept proposed herein includes embodiments in which the current driven through the motor is shaped, e.g., the current may be shaped into an approximate sinusoidal form by applying the set power level in the form of a plurality of voltage pulses per half period, where the length of the individual voltage pulses may be controlled by pulse width modulation (PWM).

In accordance with some aspects of the present disclosure, a motor unit comprises a motor and a motor control unit that has a supply circuit and a measurement circuit. The motor is driven by applying an electronically commuted supply voltage (e.g., a DC voltage) at the motor by means of the supply circuit that is part of the motor control unit. To apply the DC voltage at the motor, the supply circuit may comprise an H-bridge as is generally known in the art. The H-bridge may be a full H-bridge, but this shall not exclude that, e.g., a half bridge circuit may be used as well.

The motor control unit is used to control the supply circuit to electronically commute the DC voltage that may be supplied by a battery or a rechargeable battery. The motor control may be periodic, i.e., the motor control can be characterized by a driving frequency or a time length of a driving period, e.g., the driving frequency may be 100 Hz and the length of the driving period is then 0.01 seconds. By applying a DC voltage that periodically changes its polarity at the motor, a current is driven through the motor that periodically changes its direction.

The motor control unit may use pulse width modulation (PWM) to control the supply circuit to provide the supply voltage in pulses, where a varying duty cycle of these voltage pulses allows shaping the current that is driven through the motor, e.g., the PWM may be used to drive an approximately sinusoidal current through the motor. The PWM signal may have a PWM frequency that is higher than the driving frequency, preferably considerably higher than the driving frequency so that a plurality of voltage pulses is applied at the motor per half driving period. Just as an example, the driving frequency may be about 145 Hz and the PWM frequency may be about 37 kHz, i.e., 256 voltage pulses can then be applied per driving period (or 128 pulses can then be applied per half driving period), where the duty cycle of each of the voltage pulses can be controlled to shape the current flow. To apply one PWM-controlled voltage pulse per half driving period as discussed in US 2005/0146296 A1, the PWM frequency must be twice the drive frequency.

Generally, the drive frequency may be chosen to have a value, without limitation, in the range of 10 Hz to 1.000 Hz, preferably in the range of 30 Hz to 500 Hz and more preferably in the range of 50 Hz to 300 Hz. The PWM frequency may be identical with the drive frequency or may be twice the drive frequency, even though a PWM frequency that is much higher than the drive frequency may provide certain benefits such as a more detailed shaping of the current flow through the motor. Even though switching losses may need to be considered and a too high frequency may not balance the higher accuracy and the efficiency.

The PWM frequency may thus be higher than the drive frequency by a factor, without limitation, in the range of 4 to 10.000, preferably in the range of 10 to 5.000 and more preferably in the range of 20 to 1.000. A single PWM-controlled voltage pulse may then have an ON-length in between 0% and 100% of the complete length of the respective PWM period, which relative ON-length is typically referred to as the duty cycle. While the duty cycle may be controlled in an analog manner it may also be controlled in a digital manner and the digital resolution may, without limitation, be chosen to lie in a range of 2 bit to 64 bit, preferably in a range of 4 bit to 16 bit. At an 8-bit resolution, the duty cycle of a voltage pulse may take one of 256 levels from 0% duty cycle to 100% duty cycle.

The ON-length and the OFF-length of each PWM controlled voltage pulse may then be controlled by an underlying clock signal that has the respective high frequency to allow 256 levels of the duty cycle and the individual ON-length of each PWM-controlled voltage pulse per driving period may be stored in a look-up table in a memory unit of the motor control unit. While controlling the duty cycle of the voltage pulses applied at the motor allows shaping the driven motor current into an approximate sinusoidal shape, this of course implies that the motor current can be shaped to approximately take any other intended form, e.g., a triangular shape, a trapezoidal shape etc. Thus, a plurality of look-up tables may be provided in the mentioned memory unit to allow different current shapes.

The motor control unit, specifically the measurement circuit of the motor control unit is arranged so that a value of a physical variable is determined that is indicative of the current flow through the motor. A signal representing this value is then generated and fed into a processing unit of the motor control unit. The physical variable may be a voltage as will be discussed in more detail further below, but it may also be a current. The value (the signal representing the value) is determined during at least a measurement portion within the braking time interval, i.e., the value may be determined at an instant within the braking time interval that does not coincide with the start of the braking time interval or the value may be determined during a time period within the braking time interval that is shorter than the braking time interval and that may not start at the start of the braking time interval and/or that may not end at the end of the braking time interval.

In some embodiments, the value of the physical variable is determined by sampling the physical variable a plurality of times during the braking time interval and averaging or otherwise combining the sample values. In the present disclosure, the phrase "during the braking time interval" means either at the instant the braking time interval starts or ends or any time instant or period in between.

The basic insight described herein resides in the understanding that a value of a physical variable that is indicative of the current flow through the motor measured during a braking time interval is influenced by the back EMF and thus allows deriving the back EMF or estimating the back-EMF from such measured value. But the measured value is also influenced by other parameters, specifically the non-zero current resulting from the energy stored in the motor when the dynamic braking starts, and thus (as was already mentioned) a direct measurement of the back EMF is not possible. In accordance with the present disclosure, the measured value of the physical variable being indicative of the current flow through the motor is compared with a predetermined target value that depends on the currently applied power level, i.e., the set power level, and the intended motor amplitude.

This comparison at least allows to determine whether the set power level that is currently provided at the motor needs to be increased or to be decreased to maintain the intended motor amplitude or to at least keep the resulting motor amplitude closer at the intended amplitude than without such a control. The underlying insights and the control steps will be explained in more detail in the following.

The motor current $I_M$, which may in particular be approximately sinusoidal (a sinusoidal form is assumed here), is at its peak given by the following formula:

$$I_{M,P} = (V_{BATT} - V_{BEMF})/\sqrt{R^2 + R_X^2},$$

where $I_{M,P}$ is the peak motor current, $V_{BATT}$ is the supply voltage, i.e., the battery voltage, $V_{BEMF}$ is the back electromagnetic force, R is the sum of all ohmic resistors, and $R_X$ is the reactance of the motor coil.

In case the current flowing through the motor is sinusoidal and is driven by a relative PWM signal ranging from 0 to 1, then the motor current can be approximated by the following formula:

$$I_M = PWMW \cdot I_{M,P} \cdot \sin(\omega \cdot t + \phi_L),$$

where PWMW may be a number between 0 and 1 representing the PWM weight and $\phi_L$ is the phase shift between the supply voltage and the motor current.

Under the assumption that the dynamic braking time interval starts at a time instant where the sin-function is 1 (based on X and R values of an example motor circuit used in the assessment of the present disclosure, $\phi_L$ was found to be about 19.7 degrees), a voltage $V_{Measure}$ measured parallel to the motor circuit at the very start of the dynamic braking time interval is then given by $$V_{Measure} = -R_S \cdot PWMW \cdot (V_{BATT} - V_{BEMF})/\sqrt{R^2 + R_X^2},$$

where $R_S$ is the ohmic resistance of the resistor across which the voltage is measured.

The PWM weight factor PWMW reflects the set power level that is supplied to the motor. While the PWM look-up table mentioned before may provide duty cycle values that represent a sinusoidal function having a normalized peak of 1, the PWMW factor determines the power level and is a global weight factor that is applied on all PWM values. At PWMW=1 the maximum power level is set and provided to the motor, at PWMW=0 the lowest power level is set, and no energy is provided at the motor. The PWMW factor may take any value from 0 to 1 to set the power level that is to be provided at the motor. For sake of explanation, PWMW may be 0.35 for one intended motor amplitude under no-load circumstances and 0.6 for another intended motor amplitude under no-load circumstances.

The thus derived formula indicates a linear relationship between the PWMW value, which is a representation of the set power level provided to the motor, and the measured voltage $V_{Measure}$ at a given back electromagnetic force, $V_{BEMF}$. In other words, the relationship between PWMW and measured voltage is linear for any intended amplitude.

Figure 3:
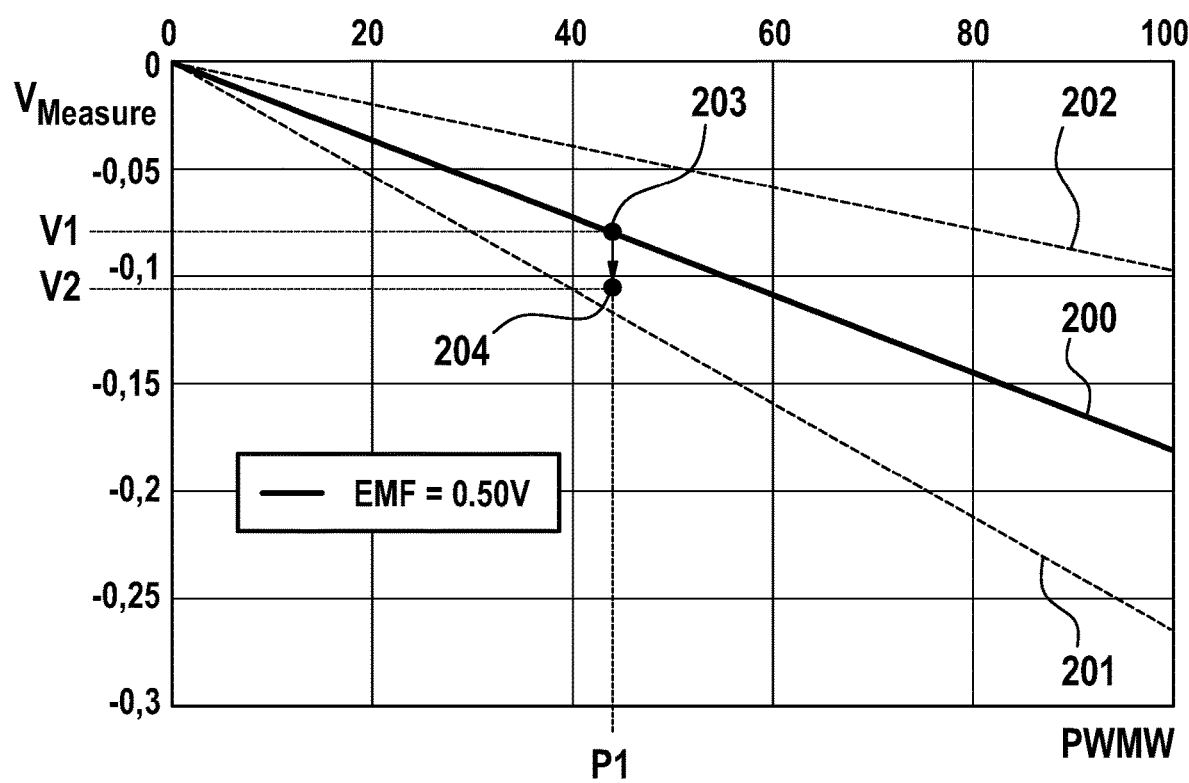
FIG. 3 is a depiction of the voltage signal that would be measured as the physical variable indicative of a current flow through the motor in dependance on the supplied power level, where three curves are shown for three different constant back-EMF values.

The linear formula may be rewritten as $$V_{Measure} = -A \cdot PWMW \text{ or } V_{Measure} = -A \cdot PWMW + B,$$

where A is just a constant for a given motor amplitude that depends on the back-EMF value and where the second variant with the additional constant value B shall only indicate that in practice $V_{Measure}$ may include an absolute shift due to the overall structure of the measurement circuit (e.g., due to a pull-up or pull-down resistor in the measurement circuit—which may be needed as the measurement circuit cannot measure negative voltages in practice). FIG. 3 discussed further below is a depiction of the measured voltage as a function of PWMW for three different constant back-EMF values.

This linear relationship is an approximation as, e.g., it was here assumed that at constant motor amplitude the back electromagnetic force will not experience any significant phase shift with respect to motor current. In practice there is some phase-shifting occurring but for the purposes of the present considerations it can be neglected. It was found that for most instances it is sufficient to assume a linear relationship. A linear relationship is easy to calibrate, e.g., in the above formula, as the voltage at PWMW=0 is a known constant, only one additional point on the curve needs to be measured, e.g., the PWMW setting needed for an intended motor amplitude at no additional external load on the motor can be used for determining the linear relationship.

But it is of course also possible to apply a more complex calibration scheme in case a linear relationship approximation is not sufficient, e.g., the power level (PWMW value) can be measured at various load situations such as two or three or four etc. different load situations (such as a load of 0.5 N, a load of 1 N, a load of 1.5 N, a load of 2 N and/or a load of 2.5 N) to calibrate the relationship between PWMW and measured voltage.

With changing external load, the back EMF will change, which means that the measured voltage, $V_{Measure}$, will deviate from the above linear curve for a set power level/PWMW, namely the measured voltage will become higher in case the load decreases (the back EMF increases as the motor amplitude increases) or lower in case the load increases (the back EMF decreases as the motor amplitude decreases). Thus, when the measured voltage is above the linear curve for the intended amplitude, the set power level, i.e., the PWMW value in the above formula, needs to be decreased so that the measured voltage is back on the linear curve for the intended motor amplitude. In contrast, when the measured voltage is below the linear curve for the intended amplitude, the set power level, i.e., the PWM in the above formula, needs to be increased so that the measured voltage is back on the linear curve for the intended motor amplitude.

This further means that for a set power level (a given PWMW value) during operation of the motor, a measured voltage deviating from the linear curve for the intended motor amplitude is an indication of a changed load situation and that the set power level should be changed to a new set power level, i.e., a different PWMW value, that leads to a motor amplitude that is essentially identical with or at least closer to the intended motor amplitude. It was found that an incremental adaptation of the power level is on the one hand sufficient to achieve the intended motor amplitude within a short time-period and on the other hand avoids jumps or noticeable jittering in the motor amplitude.

It was further found that the application of a threshold value between the measured voltage and the calibrated linear curve is sensible to avoid that a small deviation below the threshold value does not lead to a new set power level. With "threshold value" an absolute difference between measured value and the calibrated linear curve is meant. In a control system this is also generally known as a hysteresis. This serves to stabilize the motor amplitude and to avoid noticeable jittering.

This concept is discussed further below with reference to FIGS. 7A and 7B. Basically, one can perform a calibration for a plurality of intended amplitude values and a single PWMW value (i.e., at a no-load condition) for a linear relationship or for a plurality of PWMW values per amplitude in case of a non-linear relationship so that for any later measured value it can be derived (e.g., by interpolation or extrapolation) to which amplitude (and thus load situation) the measured value relates and to then compute the needed change in PWMW to shift the amplitude back to the intended amplitude (i.e. onto the target curve).

With respect to the phase shift of the motor current, it is also possible to measure or track the phase shift by the measurement circuit to compensate for any errors in the calculations. The measurement circuit can for example track the position of the voltage peaks (two for a sine wave) and their relative position with respect to the tabulated PWM values. It is then possible to shift the dynamic braking interval by the amount the tracked voltage peaks have moved so that the measurement circuit is always measuring the re-circulation current at about the same position with respect to the BEMF sinusoidal wave.

As was mentioned, the duty cycles of the PWM-controlled voltage pulses applied during one driving cycle may be chosen so that a sinusoidal drive current through the coil is generated. The duty cycle values during a driving cycle may be stored in a memory unit of the motor control unit, e.g., in case that the PWM frequency is 256 times the driving frequency, 256 duty cycle values are stored. The duty cycle values may have values from 0 to 1 or from 0% to 100%. For sake of clarity, the duty cycle values may be stored in a digital manner as mentioned in the following paragraph.

In operation, the duty cycle to be applied for a voltage pulse is the stored duty cycle times the PMWM factor. As was already mentioned, the duty cycle may be digitized and may have, e.g., an 8-bit resolution so that duty cycle values from 0 to 255 may be used or a 7-bit resolution so that duty cycle values from 0 to 127 may be used.

Further above it was stated that the PWMW value may be between 0 and 1 as well. In the following, for ease of discussion, it is assumed that the PWMW is also mapped onto a 7-bit digital scheme, where 0 is 0 and 1 is 127. In shall be understood that this is a non-limiting assumption.

As an example, the PWMW value may be set to 63 to achieve an intended peak-to-peak amplitude of the motor shaft, e.g., of 0.8 mm. As will be explained in more detail, the measured voltage—i.e., the value of the physical variable—that is expected in the no-load condition for the 0.8 mm peak-to-peak amplitude is then known from the above discussed linear formula due to an upfront calibration. In operation, the set power level may change under changing load conditions, i.e., the weighting factor PWMW will be adapted, and a new power level will be set to maintain the motor amplitude.

Let's assume the motor unit starts with the weighting factor PWMW of 63 that leads to the 0.8 mm peak-to-peak amplitude at no-load condition. If now the applied load is changed, e.g., as the personal care device is used and a movable head part is pushed against a body portion to be treated, the load leads to a drop in the motor amplitude, which leads to a change in the value of the physical variable, here the measured voltage, that is determined. The measured voltage will then drop below the target value for the no-load condition as a drop in motor amplitude leads to a drop in the back-EMF. In operation, the applied load may at one point be lower than the previously applied load and then the motor amplitude rises and consequently the back-EMF rises and thus the measured voltage may be higher than the expected value of the measured voltage. An example discussion of the control scheme will be given further below with specific reference to FIGS. 7A and 7B.

The mentioned calibration may ideally be a global calibration for the personal care device or even for all personal care devices of the given type from the manufacturer, but the personal care device may comprise different replaceable movable head parts and each of these head parts may have its own calibrated target function or tolerances of various parts of the personal care devices may require that each personal care device has its own target curve.

In order to maintain the intended motor amplitude, the PWMW factor may be changed, e.g., following the above example with a PWMW of 63 at a no-load condition, the PWMW needs to become higher when load is applied. E.g., the PWMW needs to be increased to 85 to compensate the additional load—here it is noted that the given values are for explanation only and are non-limiting. While the necessary change may be done in a single step, it also contemplated to change the PMWM only incrementally, e.g., the PWMW may be increased from 63 to 64 to set the new power level and then after the next measurement the PWMW may be increased from 64 to 65 etc. until the value of the physical variable indicative of the current flow through the motor, e.g. the measured voltage, agrees with the expected value, i.e., agrees with the value of the discussed calibrated linear relationship. In case the applied load is decreased, the PWMW may then also be decreased, preferably as well in incremental steps.

Such an incremental adjustment may avoid that large adjustments occur in every period of the driving and that the adjustment rapidly jumps into the positive and the negative direction. E.g., the comparison of the signal may indicate that an increase of the power level is to be made from a weighting factor of 63 to 79 due to an increased load, but in the just described incremental control scheme this is not the new set power level that will be subsequently (i.e., in the next driving cycle) applied. In contrast, only an incremental increase to 64 would be applied. At a driving frequency of, e.g., 145 Hz and by determining the value of the physical variable indicative of the current flow through the motor in every period, an adjustment from the highest duty cycle (127) to the lowest duty cycle (0) would still happen in less than a second (i.e., in about 0.9 seconds) and from 63 to 79 in 0.11 seconds. This shall of course not exclude that the adjustment is done non-incrementally, e.g., that the new set power level to be applied is in each period determined to immediately compensate the difference in applied load.

Further, an adjustment of the subsequent power level may not be applied if the comparison between the determined signal and the target signal leads to a difference below an absolute threshold difference value, which may effectively avoid a jittering of the adjustment and/or lead to a more stable behavior as already mentioned. That means that then the new set power level remains to be the set power level as nothing is changed.

It was already mentioned that a one-step change of the power level may be used rather than an incremental change. In case the measured voltage is not lying on the target curve for the intended amplitude, the PWMW may be changed as explained in the following. It is obvious that the measured value lies on a linear curve that has the same origin as the target curve and thus the slope relating to the currently measured voltage for an unknown amplitude can be easily determined based on the known currently set power level/ PWMW and the corresponding measured value and on the known value of the target curve at PWMW=0 (value B in the formula discussed above). The slope of this curve may be denoted as A'. By a perpendicular projection of the currently measured voltage value in the measured voltage over PWMW graph along a line that is 90 degrees rotated, i.e., a line having a slope of A"=−1/A', onto the target curve, the point of intersection between the rotated line and the target curve defines the new set power level.

While the present disclosure focuses on a linear vibration or oscillation motor (or: resonant motor), the herein proposed motor control is independent of the concrete motor type and may work with all types of motors that can be driven by applying an electronically commuted DC voltage at the motor, e.g., all types of brushless DC motors or permanent magnet synchronous motors.

FIG. 1 is a schematic depiction of some elements of an example motor unit 100 in accordance with the present disclosure. Some elements shown in FIG. 1 are optional as will be explained. The motor unit 100 comprises a motor 101, a motor control unit 110 comprising a supply circuit 120 including an H-bridge and a measurement circuit 130. The motor 101 is here indicated as being represented by a resistance, an inductance, and a voltage source. As is generally known in the art of electronic commutation, the motor 101 is here located in the bridge section of the H-bridge having four controllable switches 121, 122, 123 and 124. The H-bridge can be controlled to apply a DC voltage Vdd at the motor 101, where the polarity of the applied DC voltage depends on which of controllable switches are closed.

When switches 121 and 124 are closed to provide a current path and switches 122 and 123 are open, the DC voltage is applied with positive polarity at the motor 101 and when switches 122 and 123 are closed and switches 121 and 124 are open, the DC voltage is applied with negative polarity. The switches 121, 122, 123, 124 may be realized by MOSFETs as is common in the art. A diode may then be arranged in parallel to each of the MOSFETs as is shown in FIG. 1. The switches 121, 122, 123, 124 are controlled by a controller 140 as is indicated by four control signals S1, S2, S3, S4 that can be output by the controller 140 and which are used to control the switches 121, 122, 123 and 124, respectively, i.e. to control the instances at which the switches are closed allowing a current flow via the resistance of the respective switch and when the switches are opened to interrupt the current flow via the resistance of the respective switch.

The example measurement circuit 130 shown in FIG. 1 comprises an RC low pass filter 131 having a capacitor 1311 and a resistor 1312, a pull-up resistor 132, and an analog to digital converter (ADC) 133 that are together arranged to determine a value of a physical parameter that is indicative of the back electromagnetic force the motor 101, which physical parameter is here a voltage. The RC low-pass filter 131 is coupled with the positive polarity terminal of the motor 101. The pull-up resistor 132 is on one end connected to a reference voltage, which here is the DC voltage Vdd that may be provided by a battery or an accumulator and serves to stabilize the voltage provided by the RC low-pass filter 131 and to lift it to a value that is optimized for feeding it to the ADC 133.

The ADC 133 is here used to convert the analog voltage signal into a digital signal and—as will be explained in more detail further below—may be arranged to sample voltage values at least within a measurement portion during a braking time interval in which the motor 101 is dynamically braked. For sake of completeness, it is stated that the ADC 133 may be a portion of a hardware component realizing the processor 140, e.g., ADC 133 and processor 140 may together be realized by a microprocessor. The RC low-pass filter 131 and the pull-up resistor 132 are optional components and the voltage across switch 123 may be directly fed into the measurement circuit 130, e.g., directly into the ADC 133 or any other component that may convert the voltage signal and/or compare the voltage signal.

Dynamic braking is achieved by, e.g., closing switches 123 and 124 and keeping switches 121 and 122 open to effectively shorten the motor 101 via the resistances of the switches 123 and 124. During such a dynamic braking phase, the kinetic energy of the motor 101 is converted into electric energy. The current flowing through the motor 101 at the beginning of the braking time interval is recirculated through the motor 101 via the current path provided by the switches 123 and 124 and the current is dissipated in the resistances of the switches 123 and 124 and in the motor resistance. In contrast to a regenerative braking, in which the motor current is fed back to the battery, the current drop is slower in the dynamic braking which renders the dynamic braking energetically more efficient than the regenerative braking.

Figure 2A:
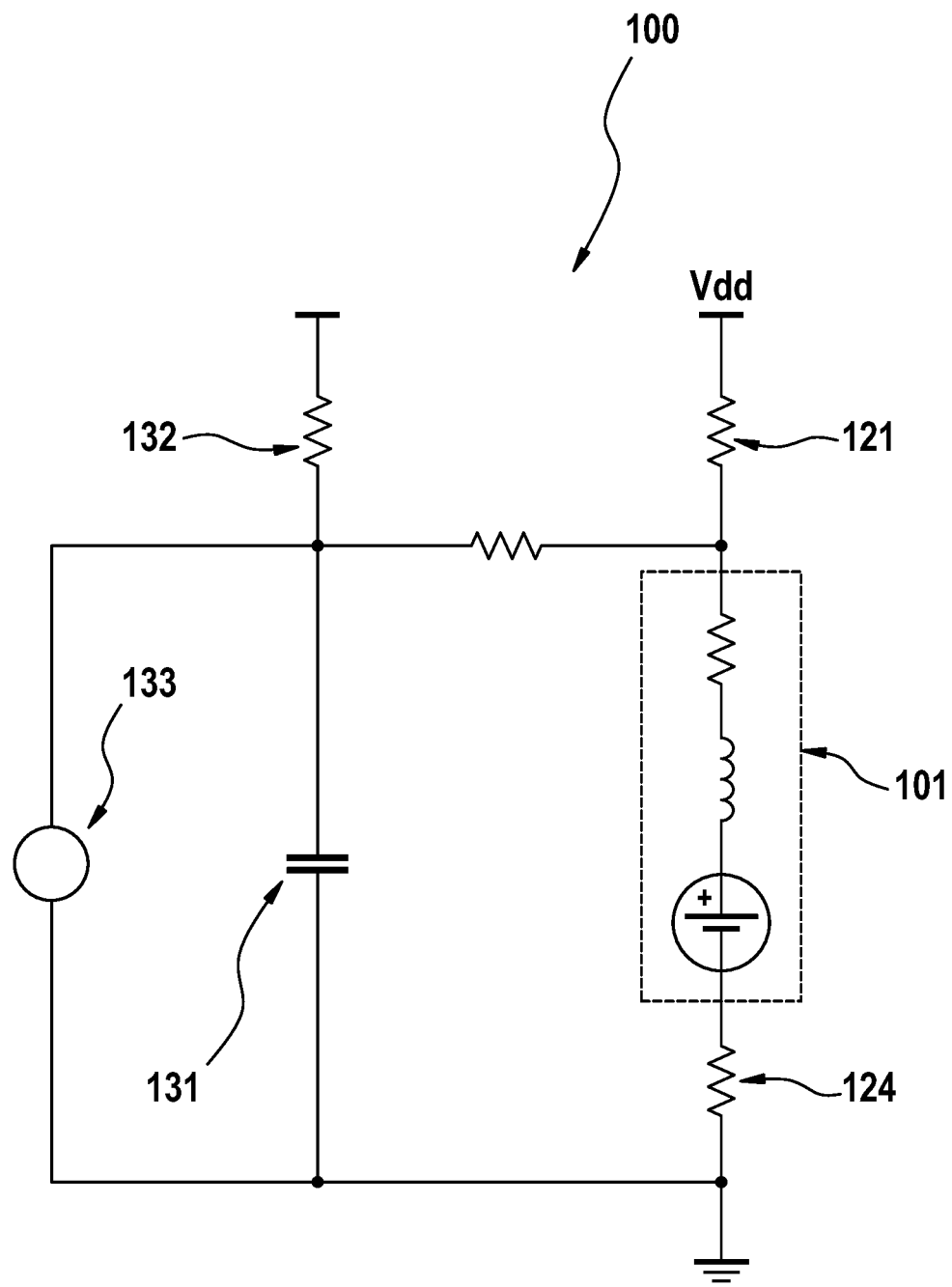
FIG. 2A is a depiction of the relevant elements of the motor unit shown in FIG. 1 during a first commuting phase.
Figure 2B:
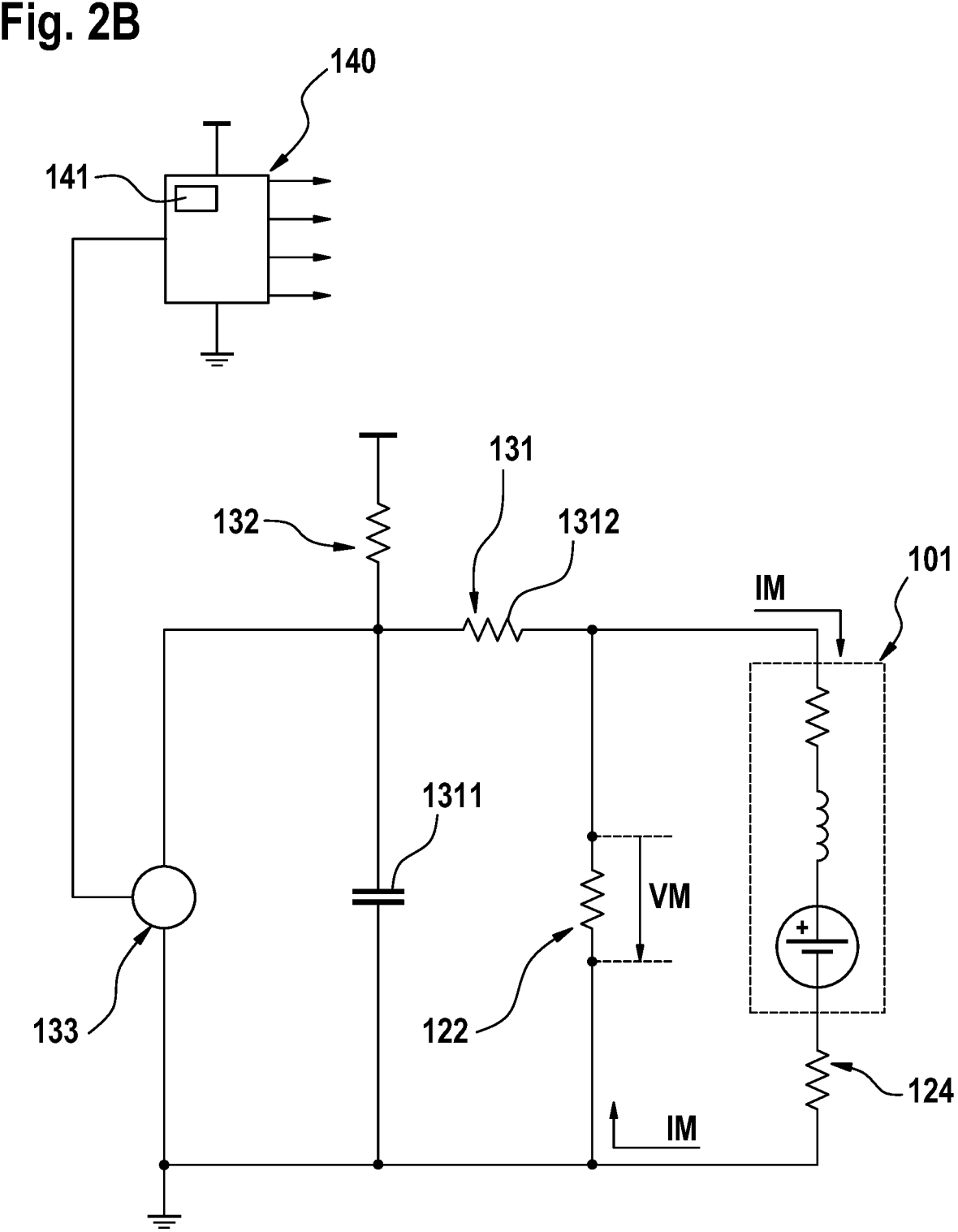
FIG. 2B is a depiction of the relevant elements of the motor unit shown in FIG. 1 during a dynamic braking time interval.
Figure 2C:
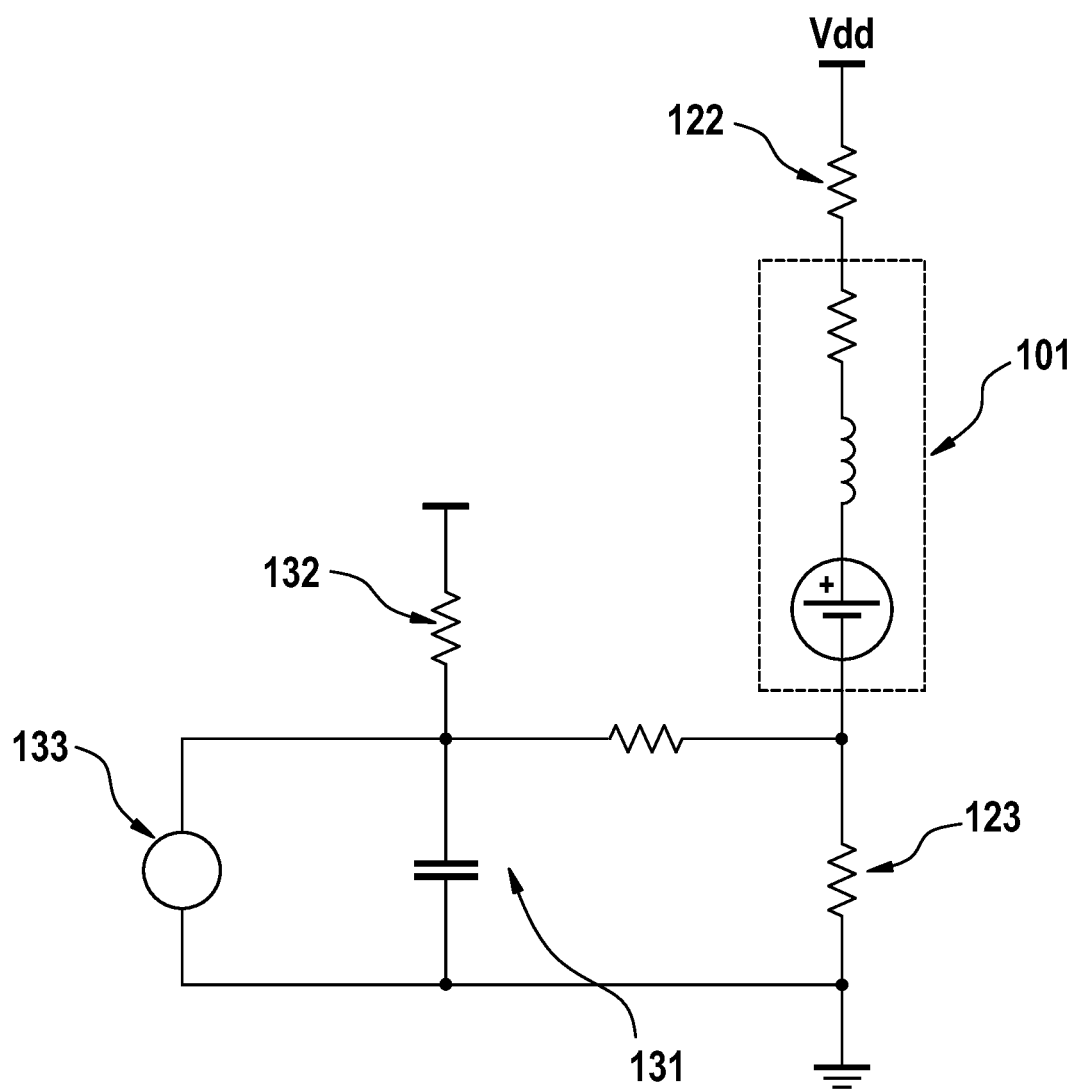
FIG. 2C is a depiction of the relevant elements of the motor unit shown in FIG. 1 during a second commuting phase.

FIGS. 2A to 2C are depictions of the effective circuit structure of the motor unit 100 shown in FIG. 1 in a positive half cycle of the motor driving during application of a voltage pulse—shown in FIG. 2A, in a dynamic braking time interval—shown in FIG. 2B, and in a negative half cycle of the motor driving during application of a voltage pulse—shown in FIG. 2C. For sake of simplicity, the controller 140 is not shown in FIGS. 2A and 2C but it shall be understood that the controller 140 is of course present to control the H-bridge so that the effective circuit structures as shown are created.

In FIG. 2A the switches 121 and 124 are closed and essentially function as resistors, while switches 122 and 123 are open and do not contribute to the effective circuit structure and are thus not shown. In this phase the DC voltage Vdd is provided at the positive terminal of the motor 101. As was already explained, the DC voltage Vdd may be applied to the motor at a PWM frequency higher than the driving frequency and FIG. 2A of course only applies for the ON period of the voltage pulse application. The provision of the DC voltage Vdd with positive polarity may be maintained for a first time period that may be interrupted by a dynamic braking time interval.

FIG. 2C shows the circuit structure when the DC voltage is provided at the motor with opposed polarity (i.e., negative polarity), when switches 122 and 123 are closed and switches 121 and 124 are open. The provision of the DC voltage Vdd with negative polarity may be maintained for a second time period (again, the DC voltage Vdd may be applied in pulses), which second time period is preferably as long as the first time period. The provision of the DC voltage with positive polarity and with negative polarity may be periodically repeated (at the driving frequency).

The period of this periodic function is then given by the sum of the first time period and the second time period. E.g., the period may be 6.8966 ms or, in other words, the motor is then driven with a driving frequency of 145 Hz. It shall be understood that this is just an example and generally any other driving frequency may be used, e.g., 0.5 Hz, 2 Hz, 7 Hz, 13.4 Hz, 29 Hz, 52 Hz, 84 Hz, 112 Hz, 140 Hz, 141 Hz, 142 Hz, 143 Hz, 144 Hz, 146 Hz, 147 Hz, 148 Hz, 149 Hz, 150 Hz, 184 Hz, 250 Hz, 400 Hz etc.

FIG. 2B shows the circuit structure during a dynamic braking time interval, where the switches 123 and 124 are closed and the switches 121 and 122 are open. The same circuit structure is also typically effective in the "off" phase of the PWM voltage pulse application, but just for a short time—the dynamic braking interval typically spans more than the time period of applying a single voltage pulse, e.g., may span at least the time interval for applying two or more DC voltage pulses. As will be explained in more detail further below, it is preferable to apply a braking time interval that is as short as possible as this will have the smallest effect on the shape of the current through the motor 101.

The motor 101 is shortened via the switches 123 and 124 and the motor current $I_M$ recirculates through the motor 101 and the resistances of the switches 123 and 124 and the kinetic energy of the motor 101 is converted into electric energy. The measurement circuit 130 is arranged to measure the value of the physical variable indicative of current flow through the motor 101 only during the dynamic braking time interval, preferably only within a measurement portion of the braking time interval that is shorter than the braking time interval itself—i.e., the measurement portion may not start at the instant the braking time interval starts but may start later and/or will not end when the braking time interval ends but may end earlier. The measurement may happen at one single instant or several measurements may happen within the measurement portion.

The signal that is measured in accordance with the set-up as shown in the FIGS. 1 and 2B is the voltage drop $V_M$ across the resistance of switch 123, which is the same voltage that can be measured across the motor 101 and the resistance of switch 124 and which voltage is thus indicative of the back electromagnetic force induced in the motor coil due to the motion of the permanent magnet(s). The present example shall not exclude that the signal indicative of the back electromagnetic force is the voltage that can be measured between the positive and the negative terminal of the motor 101 or that indeed the current flowing through the motor 101 is measured as the physical variable.

The DC voltage Vdd may be provided at the motor 101 by means of a pulse width modulation (PWM) as was already indicated, i.e., the H-bridge may be controlled to provide the DC voltage Vdd during the first and second time period in an intermittent manner with a PWM frequency higher than the driving frequency. E.g., in case the driving frequency is about 145 Hz then the frequency with which the DC voltage Vdd is provided by PWM-controlled pulses may be about 37.12 kHz, which means that 256 DC voltage pulses are then applied per period and 128 voltage pulses per half period, i.e., during the positive or negative half period (the terms period and cycle are here used interchangeably). As in accordance with the present disclosure a braking time interval is proposed, the number of pulses that are applied per half period may of course be lower than 128 (in the given example).

The voltage signals applied by PWM may have a varying length per pulse, e.g., the voltage signals may have a low ON time at the beginning and the end of the half period and a high ON time in the center of the half period so that the shape of the current driven through the motor can be controlled (the sum of the ON period and the OFF period of each applied pulse is typically constant and is of course determined by the PWM frequency, e.g. 37.12 kHz in the present example). In some examples, the PWM may apply voltage pulses in a manner that a sinusoidal current is approximately achieved. In the OFF time following each ON time, the H-bridge may be controlled for dynamic braking of the motor, i.e., to switch into a circuit structure as shown in FIG. 2B as was already indicated. For sake of clarity, any other current shape than a sinusoidal shape may be intended as well, e.g., a trapezoidal shape, a triangular shape, a rectangular shape etc., where it is understood that the current is a periodic function in accordance with the drive frequency.

FIG. 3 is a depiction of the measured voltage $V_{Measure}$ as the value of the physical variable indicative of the current flowing through the motor for different constant back-EMF values against the PWM weight PWMW. As was derived in a previous paragraph, the measured voltage can be expressed as $V_{Measure}=-R_S \cdot PWMW \cdot (V_{BATT}-V_{BEMF})/\sqrt{(R^2+R_X^2)}$ or more generally as $V_{Measure}=-A \cdot PWMW+B$ under the discussed assumptions. In FIG. 3, the offset value was assumed to be B=0 but it shall be understood that due to a pull-up resistor that may be used or due to or other circuit specifics, the offset B may have a non-zero value. Curve 200 shows the measured voltage for a medium back-EMF value (e.g., $V_{BEMF}=0.5$ Volt), curve 201 for a lower back-EMF value (e.g., $V_{BEMF}<0.5$ Volt) and curve 202 for a higher back-EMF value (e.g., $V_{BEMF}>0.5$ Volt).

As was already discussed, a given back-EFM value relates to a given amplitude. Curve 200 may thus relate to a peak amplitude value of a given linearly reciprocating motor of, e.g., 0.8 mm and may represent the target curve. In case the measured voltage does not lie on the target curve 200 (the PWMW is known by the system and represents the set power level), then the motor control unit will take measures to change the PWMW so that ideally in a next measurement the measured voltage is at least closer to the target curve. It is obvious that the space between the curves 201 and 202 is filled with curves that each relate to one back-EMF value and thus to one motor amplitude. Thus, it can be understood that every point between these curves can be assigned to a back-EMF value and thus to an amplitude of the motor.

In order to generate the intended amplitude at a no-load condition, a certain power level needs to be provided at the motor, which power level is indicated as P1 so that the voltage V1 is measured and the respective point 203 on the target line 200 is indicated. If now the load increases, the measured voltage drops, e.g., at a given load value the measured voltage drops to V2 and the respective point in the diagram is 204 as the PWMW is still P1. The concept is now to increase the PWMW to another obviously higher value so that the measured voltage lies again on the target line 200.

A more detailed discussion of example adaptation process steps is provided further below in connection with FIGS. 7A and 7B. But as can be stated here that it is of course possible to determine P and V values for various amplitude values and load values to allow, e.g., by means of a two-dimensional interpolation, a determination to which amplitude and load value the currently determined P/V-combination relates and which P value would be needed to reach the intended target line at the current load situation.

Figure 4:
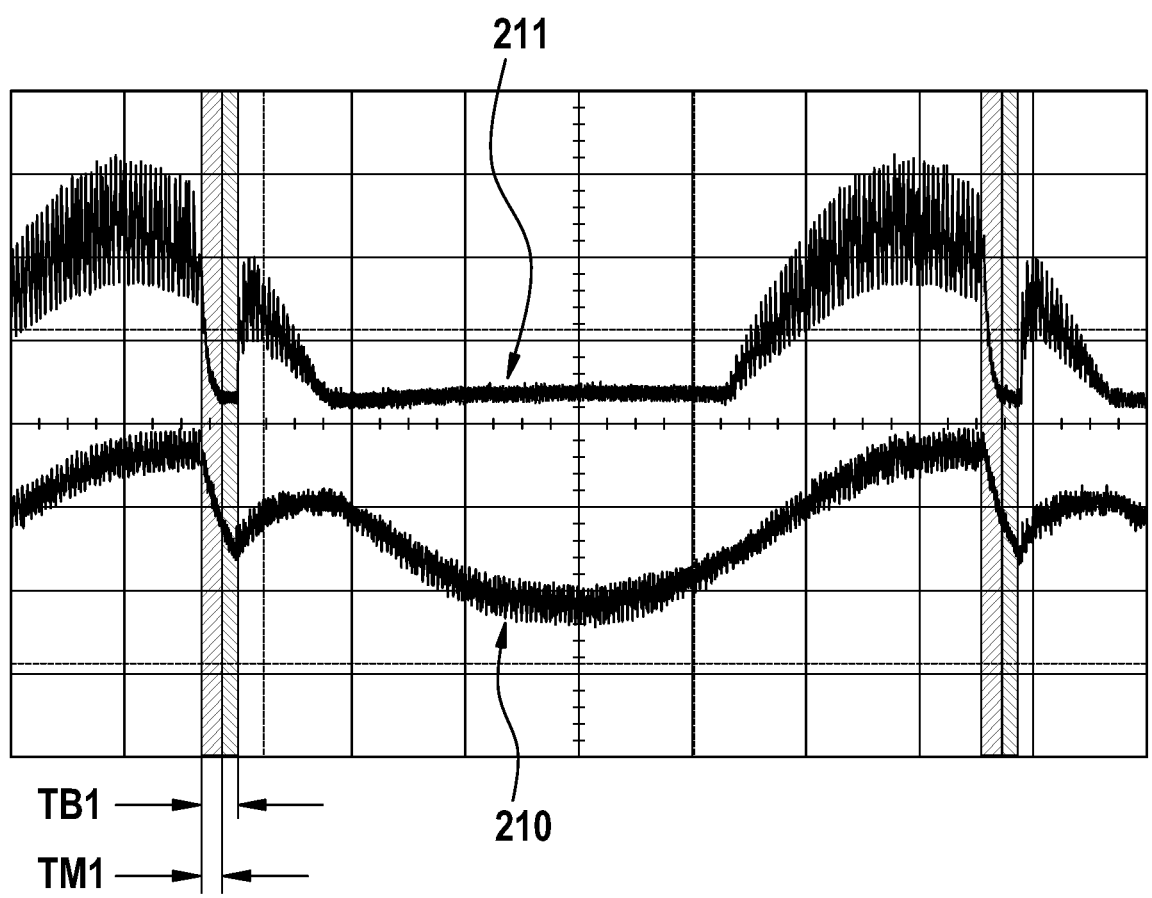
FIG. 4 is a depiction of a voltage signal and of a current signal over time for an example having a medium sized braking time interval, where the associated disturbance of the intended sinusoidal current flow through the motor is seen in the temporal current behavior.

FIG. 4 is a depiction of a current signal 210 flowing through a motor and of a voltage signal 211 that can be measured by the measurement circuit 130 shown in FIG. 1 for a time span of about one and a half periods. It is noted that these signals represent real measured values, and that the measurement circuit comprised an RC filter circuit as shown in FIG. 1, but as was already mentioned, the RC filter is an optional circuit element. The RC filter causes the voltage pulses to not drop to zero ant to not rise to Vdd. A braking time interval $T_{B1}$ is indicated during which the motor is dynamically braked. A negative voltage cannot be measured by measurement circuit 130 and thus there is no negative voltage visible during the negative polarity phase.

It can be seen that the signals 210 and 211 reflect the application of the DC voltage by means of a PWM as the voltage signal 211 essentially shows pulses and the current signal 210 shows a ripple associated with the application of voltage pulses. It can be seen that the current signal 210 drops significantly during the braking time interval $T_{B1}$, which leads to a noticeable deviation of the shape of the current flowing through the motor from a sinusoidal form. A reenergization phase follows after the braking time interval $T_{B1}$ during which energy is provided to the system until the current signal 210 is about back on an approximate sinusoidal curve. The longer the braking time interval $T_{B1}$ the stronger will the current signal 210 deviate from a sinusoidal curve.

The voltage signal 211 also drops after the start of the braking time interval $T_{B1}$. The value of the physical parameter indicative of the current flowing through the motor, i.e., the measured voltage in the here discussed examples, may be measured during a measurement portion $T_{M1}$ of the braking time interval $T_{B1}$, where the measurement portion $T_{M1}$ may be smaller than the braking time interval $T_{B1}$. The measured voltage may be determined at any given time instant within the braking time interval $T_{B1}$ or the measured voltage may be determined by averaging or otherwise combining several voltage values sampled during the measurement portion $T_{M1}$.

Figure 5:
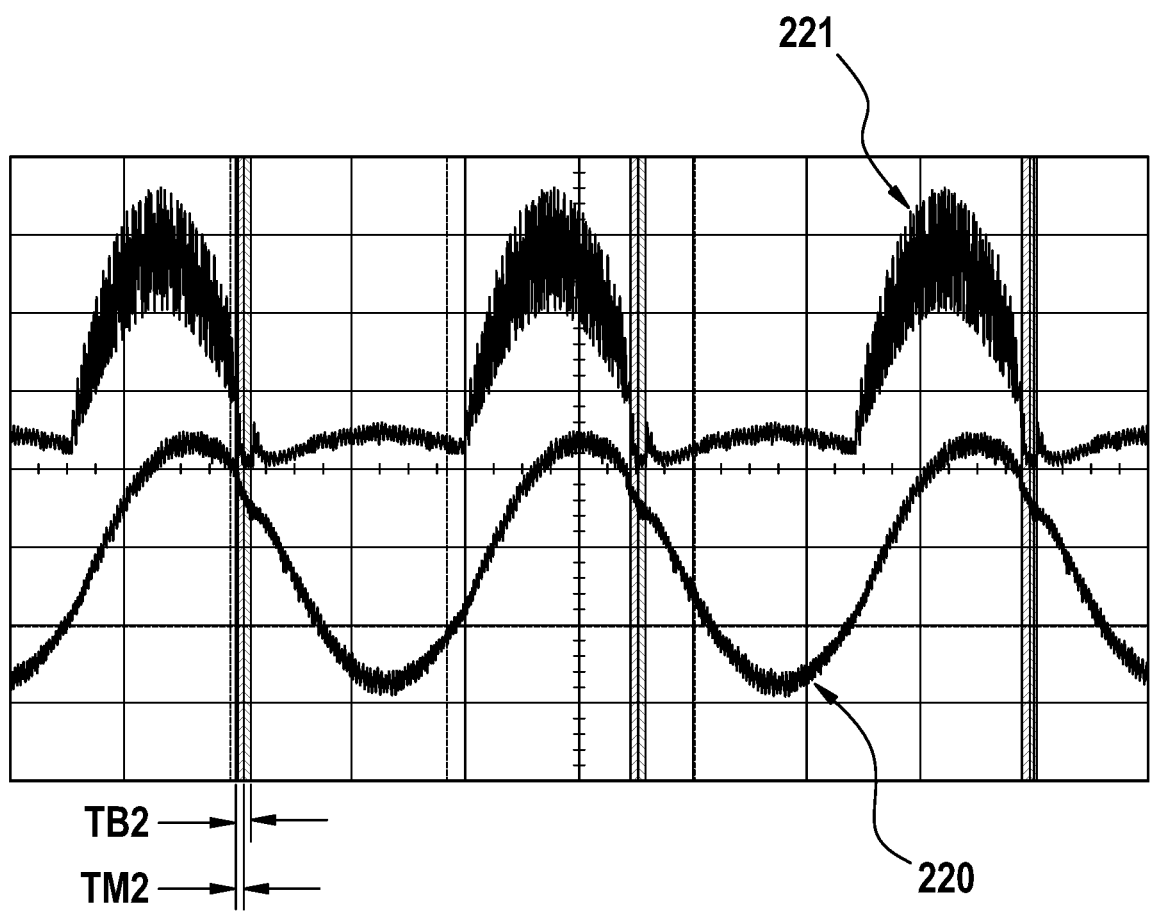
FIG. 5 is a depiction of a voltage signal and of a current signal over time for an example having a small sized braking time interval, where the associated disturbance of the intended sinusoidal current flow through the motor is seen in the temporal current behavior.

FIG. 5 shows, similarly to FIG. 4, a current signal 220 and a voltage signal 221 for a time interval having a length of about three periods. A braking time interval of length $T_{B2}$ is indicated in each of the positive polarity half periods. This braking time interval $T_{B2}$ is smaller than the braking time interval $T_{B1}$ shown in FIG. 4. Due to the shorter braking time interval, the distortion of the current signal 211 is less prominent than the distortion of the current signal 201 shown in FIG. 4. A short braking time interval leads to a rather energy efficient motor control as less energy is dissipated during the braking time interval. Further, the intended current shape is less distorted. A sinusoidal current may lead to a rather silent overall motor design as harmonics are less prominent. The higher the distortion, the stronger the harmonics become and the noisier the motor may become.

Overall, a reduction of the braking time interval is sensible, but must be balanced with the preciseness of the measurement of the value of the physical parameter indicative of the current flowing through the motor. The length of the braking time interval shown in FIG. 5 is about 5% of the length of the driving period. Generally, while the length of the braking time interval should not be limited, the braking time interval may have a length of about 20% of the period or less, preferably of about 15% or less, further preferably of about 10% or less and even further preferably of about 5% or even less, e.g., less than 3%. It shall not be excluded that the length of the braking time interval may be varied from period to period.

The braking time interval may also be used to support other aspects of the motor control. E.g., the motor control unit may be arranged to increase the braking time interval if the signal indicates a high load on the motor above a threshold value. Such a high load would in turn lead to an ultimately strong increase of the ON-time of the PWM voltage pulses to apply more energy to the motor to overcome the high load and to maintain a constant amplitude. But a sudden release of the load may then lead to a sudden over-energizing of the then unloaded motor, which may cause issues for the motor. Thus, the motor control unit may be arranged to increase the braking time interval at higher load above a threshold load in order to indeed brake the motor. Another solution may be to not provide a power level beyond a certain power level threshold.

Figure 6A:
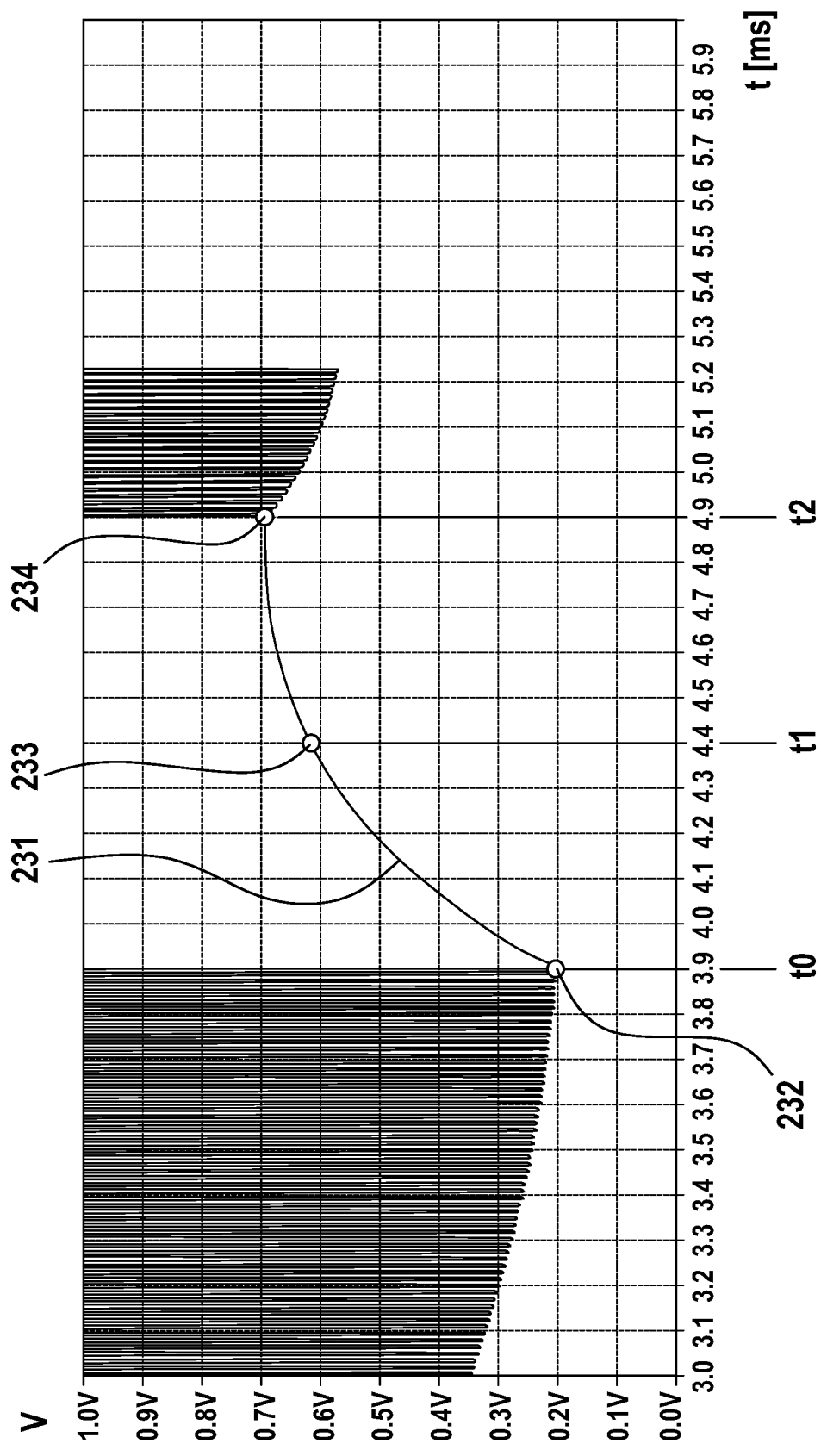
FIG. 6A is a depiction of a magnification of a simulated voltage signal before, during and after a dynamic braking time interval for a first level of the back electromagnetic force.
Figure 6B:
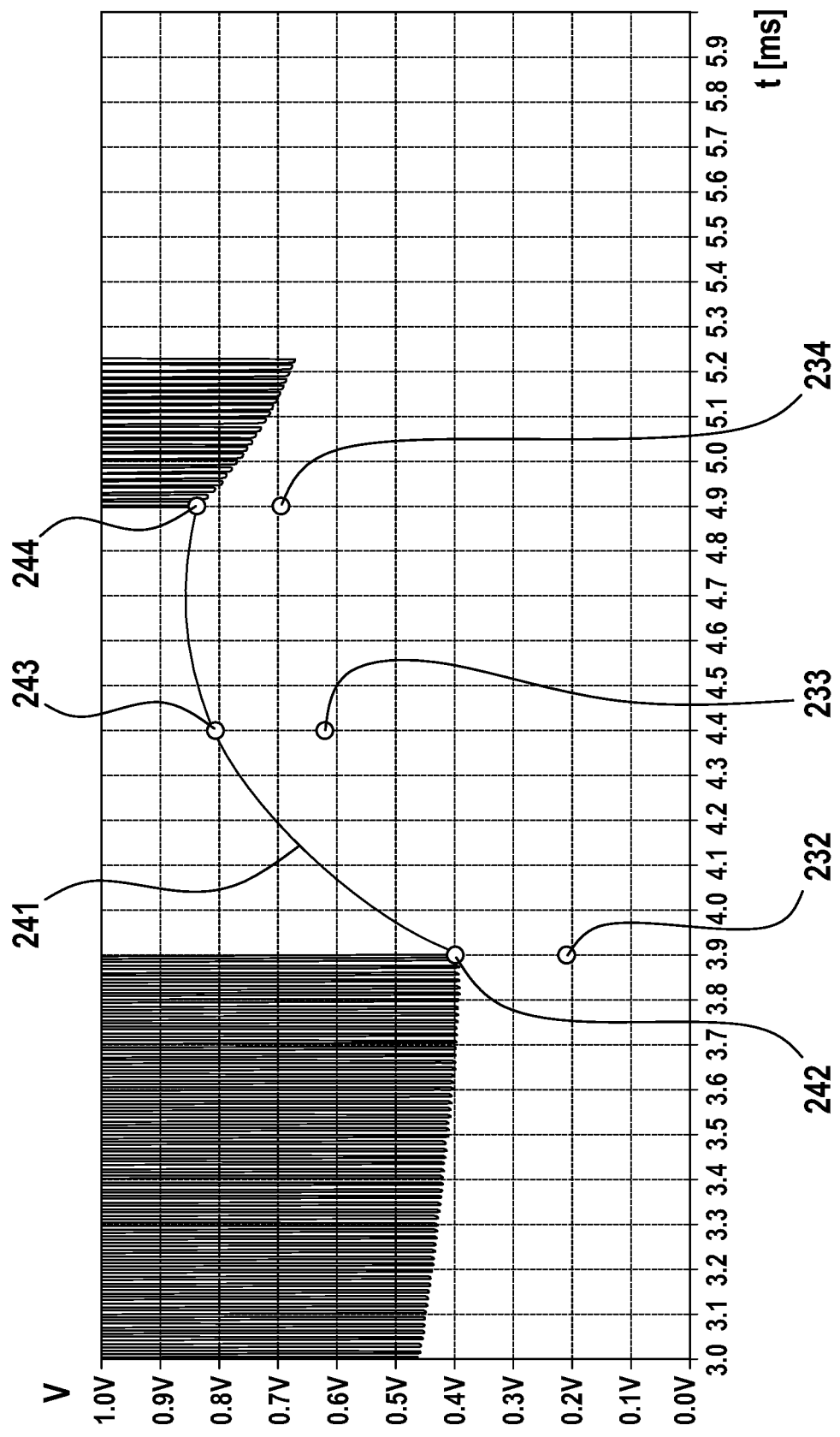
FIG. 6B is a depiction of a magnification of a simulated voltage signal before, during and after a dynamic braking time interval for a second level of the back electromagnetic force higher than the first level.
Figure 6C:
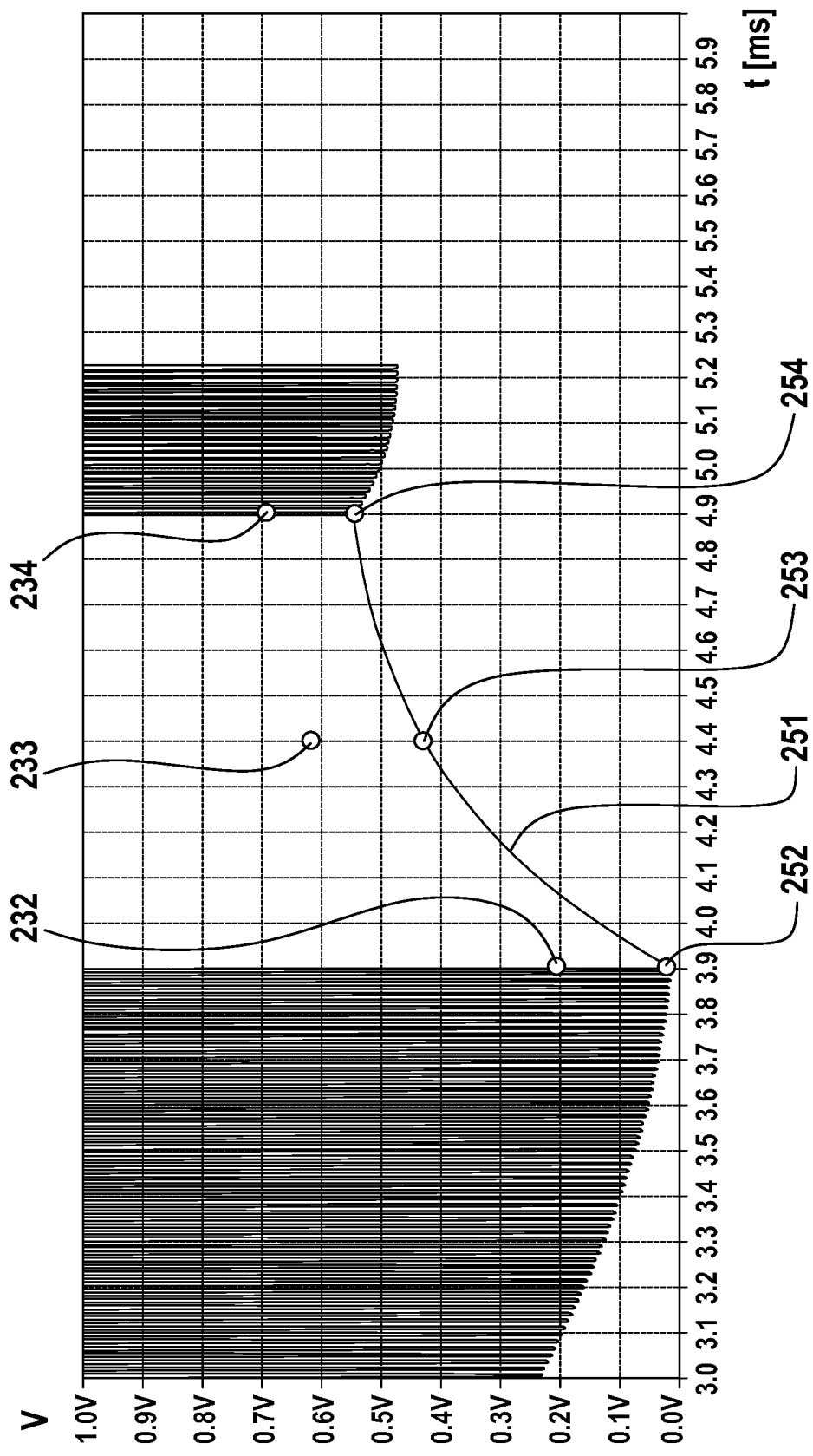
FIG. 6C is a depiction of a magnification of a simulated voltage signal before, during and after a dynamic braking time interval for a third level of the back electromagnetic force lower than the first level.

FIGS. 6A to 6C show a magnification of simulated voltage signals in and around a braking time interval for three different back-EMF values. The simulation was done without the RC filter shown in FIG. 1. Without the RC filter, the voltage signal immediately drops at the beginning of the braking time interval. FIG. 6A shows a voltage curve 231 that relates to a given back-EMF value, e.g., 1.5 Volt, FIG. 6B shows a voltage curve 241 for a higher back-EMF value, e.g., 2.5 Volt and FIG. 6C shows a voltage curve 251 for a lower back-EMF value, e.g., 0.5 Volt.

In all three FIGS. 6A to 6C three measurement points 232, 233, 234 and 232, 243, 244 and 252, 253, 254 are indicated that are in every case occur at the three identical time instants $t_0$, $t_1$ and $t_2$ after the start of the braking time interval. It is to be assumed that the measurement instant stays constant—i.e., in case to is chosen as measurement instant, the voltage signal is always measured at $t_0$. It is again assumed that FIG. 6A shows the voltage curve when the target amplitude is achieved. FIG. 6B then shows the lower load situation and FIG. 6C the higher load situation. In FIGS. 6B and 6C the respective voltage values of the target voltage curve shown in FIG. 6A are shown. FIGS. 6A to 6C indicate that it is indeed irrelevant where in the braking time interval the voltage is measured as at every constant time instant the voltage values behave similar but have a different offset.

Figure 7A:
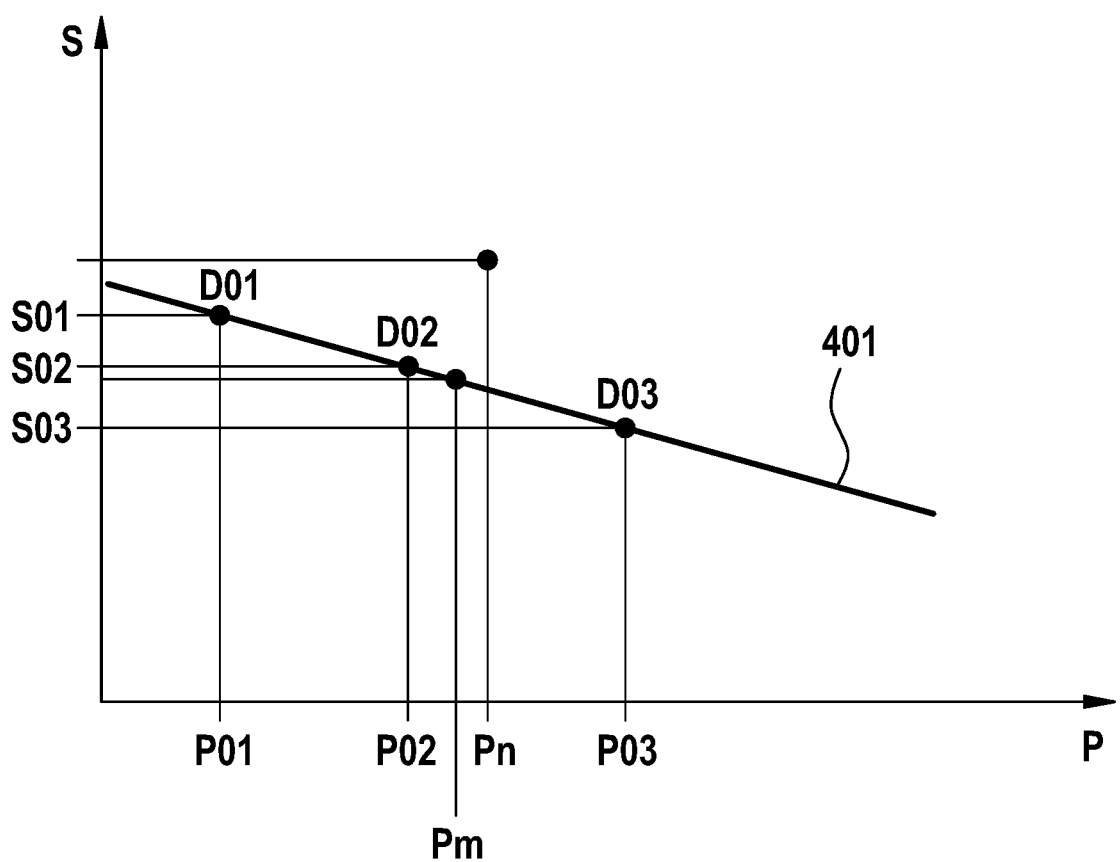
FIG. 7A is a schematic depiction showing the relation between the set power level supplied to the motor and the measurement signal for some examples.
Figure 7B:
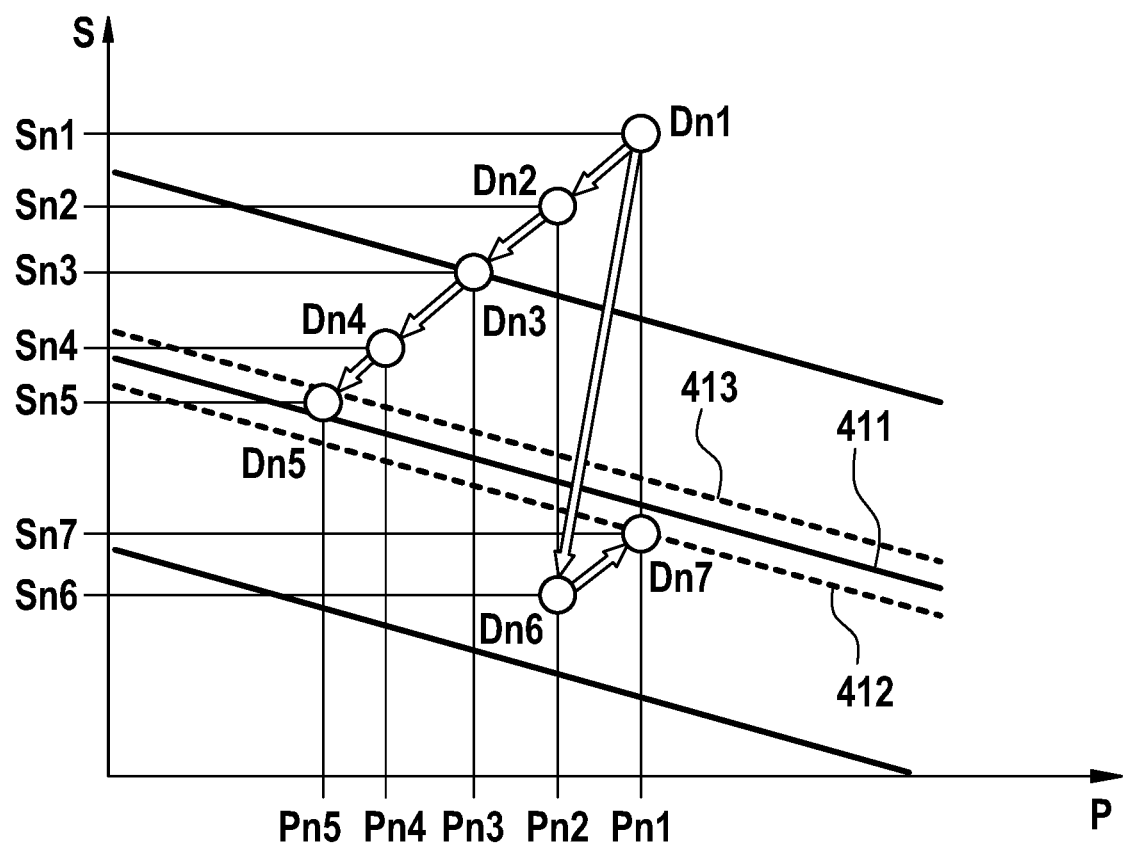
FIG. 7B is a schematic depiction showing the relation between the set power level supplied to the motor and the measurement signal for some examples in a time sequence of measurements and resulting iterative adaptations of the set power level.

FIG. 7A is a depiction of a target line 401 of the measured voltage signal S in dependence on the currently delivered power level P. The target line 401 represents the line for one given back-EMF value or motor amplitude in dependence on the PWMW, i.e., for different load conditions as increasing the load requires increasing the set power level to maintain the amplitude. For example, dot D01 represents the voltage signal S01 that is measured at a no external load situation at which the power level P01 is provided at the motor to achieve said motor amplitude.

In case the load increases, a higher power level needs to be provided to the motor to still achieve the same motor amplitude. E.g., at a first load situation associated with a first non-zero external load, a power level P02 is delivered to the motor and a signal S02 would be measured, while at an increased second load level a power level P03 needs to be delivered to achieve the intended motor amplitude and the signal S03 would be measured. As was explained, the target curve can be assumed to be linear and can be by simply storing an absolute value and a gradient the respective curve is made available.

As was already discussed with reference to FIG. 3, the measured voltage signal changes when the load changes. If the current load is zero, a load change can only mean an increase of the load and as the PWMW stays the same, the measured voltage signal drops as the increased load reduces the amplitude and thus the BEMF. The PWMW then needs to be increased to compensate the drop in amplitude so that the amplitude is maintained, and the measured voltage value lies again on the target line. In operation, when load is applied, the applied load may decrease or increase—hence the measured voltage signal may as well increase or decrease. As a consequence, the PWMW then needs to be decreased if the load was reduced or increased in case the load was increased. The motor control unit may be arranged to set a new power level that compensates the changed load completely so that the next measurement would ideally lie on the target curve.

Instead of directly adjusting the set power level so that the intended motor amplitude would be theoretically achieved in the next period, which may anyhow not be achievable due to the inertia of the real motor system, an incremental approach may be chosen as was already mentioned and which incremental approach will be explained with reference to FIG. 7B. In FIG. 7B the currently applied power level P is again plotted on the horizontal axis and the measured voltage signal S is plotted on the vertical axis. Target curve 411 represents the target line for an intended motor amplitude. Dot Dn1 schematically represents the P value that is known (currently set power level Pn1) and the S value that was determined (measured voltage signal Sn1), respectively.

As was explained, currently applied power level Pn1 may relate to a weighting factor of the normalized voltage pulse duty cycle of 69 (which is of course just an example used for reasons of explanation only). It is known that any dots above the target line 411 relate to motor amplitudes that are too high, i.e., the currently provided power level Pn1 is too high. Instead of reducing the currently applied power level by a large amount to hit the target line 411 in the next period, the new set power level is increased in an incremental manner, e.g., the new set power level may then relate to a weighting factor of 68 in the subsequent period, which may then lead to dot Dn2 in the next period relating to the power level Pn2 and the signal Sn2.

While of course the load situation may change from one period to the other, the explanation here assumes that the load situation stays constant. As expected, dot Dn2 lies closer to the target curve but is indicating that the new set power level Pn2 is still too high. In the next period the subsequent power level Pn3 relating to a weighting factor of 67 will thus be applied, which leads to dot Dn3 relating to power level Pn3 and signal Sn3, still being too high so that the new set power level is again lowered to Pn4 relating to a weighting factor of 66, which leads then to dot D04.

A final incremental adjustment in this example then leads to dot D05, which is very close to target line 411. In FIG. 7B two tolerance or hysteresis lines 412 and 413 are indicated as dashed lines. The adjustment procedure may stop applying any further adjustments in case a dot of P and S values is within the band indicated by these tolerance lines 412 and 413 to avoid a jittering of the adjustment. In this example, the complete adjustment procedure from Dn1 to Dn5 required four adjustment steps. While this is of course just a schematic example, four adjustment steps at a 150 Hz driving frequency require less than 3 ms.

As was mentioned, the user may change the load situation rather rapidly and as the result of the adjustment done after determination of dot Dn1, dot Dn6 may be determined instead of the expected Dn2. But for the adjustment procedure this is of no concern. Dot Dn6 obviously relates to the set power level Pn2 (weighting factor 68) that at the given load situation leads to a too low motor amplitude as implied by signal value Sn6, i.e. the currently achieved motor amplitude is below the intended motor amplitude and the adjustment procedure would increase the subsequently applied power level (to weighting factor 69 again) and dot Dn7 (due to determination of signal Sn7) may be determined in the next period, where dot Dn7 then in the shown example lies within the band defined by the tolerance or threshold or hysteresis lines 412 and 413 and no further adjustment would be done until a next determination of an S value (at current power level Pn1 relating to weighting factor 69) would again lie outside of the tolerance band given by lines 412 and 413.

It is the aim of the herein proposed system and method to allow to maintain the intended motor amplitude or to at least stay close to the intended motor amplitude based on a measurement of a value of a physical variable that is indicative of the current flowing through the motor. As was explained before, the signal may be sampled at the very beginning of the braking time interval or within a measurement portion of the braking time interval. Wherever the sampling is done in the braking time interval, it was found that it comprises the relevant motor amplitude information, i.e., the relevant back electromagnetic force information that needs to be extracted.

It is noted here that the individual duty cycle values for an intended current shape (i.e., a sinusoidal shape) may be stored in a memory unit of the motor control unit and thus an increase or decrease as discussed would affect all duty cycle values in the same manner by adjusting the weighting factor PWMW. That means that the absolute increase/decrease of 0.5% at 50% duty cycle translates into a relative 1% increase/decrease of all tabulated duty cycle values. In other words, the duty cycle values as tabulated are scaled in dependence on the currently defined increase or decrease value.

Figure 8:
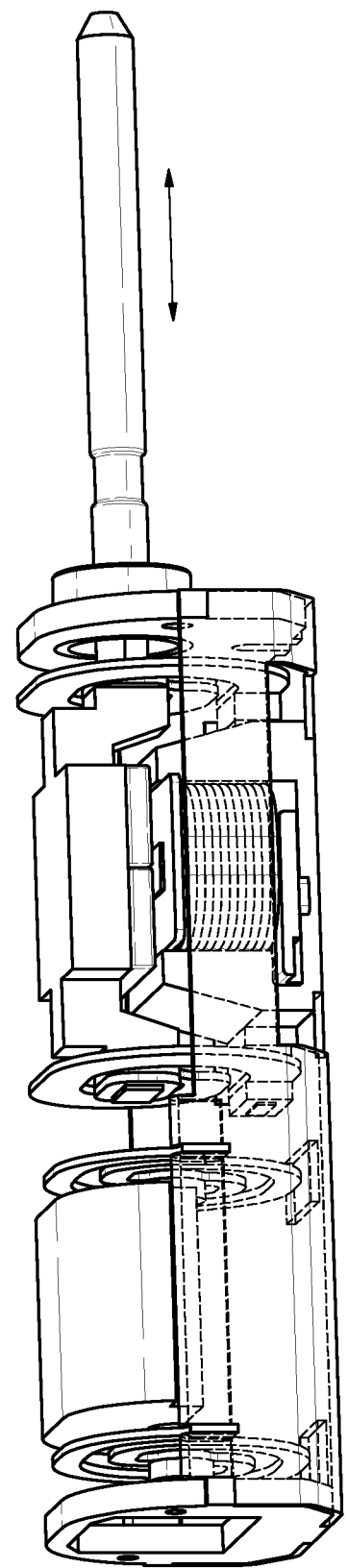
FIG. 8 is a schematic depiction of a motor comprising a stator and a rotor that can be used in a motor unit as herein discussed.

FIG. 8 is a depiction of an example motor 500 that can be used in a motor unit as proposed in the present application. The motor 500 comprises a stator 510 having a coil 511 and an armature 520 comprising at least one permanent magnet 521—in the shown example two permanent magnets 521 are used and the coil 511 is wound around an E-shaped stator core. A drive shaft 530 is fixedly secured at the armature 520. The stator 510 is fixedly mounted at a motor carrier 540 and the armature 520 is mounted at the motor carrier 540 by means of armature mounting springs 528.

In operation, the electronically commuted DC current is applied at the coil 511 so that a current is driven through the coil 511. It the present disclosure, the current through the coil 511 in the shown example is referred to as the motor current. Due to the current flow, an electromagnetic field is created that interacts with the permanent magnets 521. When the current is driven through the coil 511 in a first direction, an electromagnetic force acting on the permanent magnets 521 deflects the armature 520 into one direction and when the current flow direction is reversed, the armature 520 is deflected into the opposite direction as is indicated by double arrow M.

If the DC voltage is applied at the coil 511 in a manner so that the polarity of the DC voltage changes in a periodic manner, the armature 520 is driven into a periodic linear reciprocating motion. As the spring-mounted armature 520, 528 forms a spring-mass system, it can be characterized by a resonance frequency at which an excitation of the spring-mounted armature 520, 528 leads to maximum deflection amplitude. The motor 500 as shown in FIG. 7 may typically be driven with a driving frequency of the periodic DC voltage that is at or close to the resonance frequency.

In the shown embodiment, a so-called dynamic vibration absorber 550 is attached to the motor carrier 540 to compensate vibrations of the motor carrier 540 caused by the periodic driving of the armature 520. In accordance with Newton's third law (action equals reaction or the conservation of impulse in a closed system) the impulse of the driven armature 520 must be compensated by a reverse impulse of the motor carrier/stator unit. The latter will lead to vibrations of the handle of a device in which the motor is disposed as long as the motor is not completely mechanically decoupled from the handle.

Vibrations of the handle are detrimental for a positive user experience during operation of the device and thus measures are taken to at least reduce such vibrations, which may take the form of a dynamic vibration absorber. The dynamic vibration absorber 550 comprises a mass 551 and mounting springs 558. In order to optimally compensate the vibrations of the motor carrier 540, the resonance frequency of the dynamic vibration absorber is tuned to the driving frequency (or the driving frequency is set to be as close to the resonance frequency of the dynamic vibration absorber as possible). It is understood that the dynamic vibration absorber 550 is an optional feature.

It is noted that the shown resonant vibration motor 500 is just one example of a motor that can be used in a motor unit discussed herein, e.g., any brush-less DC motor can be used as well.

As was mentioned, in a motor 500 as discussed with reference to FIG. 8, the driving frequency is governed by the resonance frequency of the dynamic vibration absorber and not by the resonance frequency of the spring-mounted armature 520, 528. The latter may mean that in a series of motors 500 there is a varying spread of driving frequency and resonance frequency of the spring-mounted armature, where it is known that such difference has an effect on the phase difference between the motion of the armature and thus of the back electromagnetic force and of the exciting force, i.e. of the driving function.

It was found that under some conditions the herein described linear calibration of the target curve between currently applied power level and determined signal may not sufficiently describe the system anymore. In such instances, a non-linear target curve may be applied (e.g., a quadratic target curve) and/or the position of the braking time interval within the respective half period may be adjusted to get closer to the maximum of the back electromagnetic force. This position can be determined by a simulation of the system or by experiments. Similarly, it was found that in case that the motor is used to drive different replaceable head portions of the personal care device, where the inertia of the drivable head portions varies, the calibration of the target curve may be valid for all such replaceable head portions and individual target curves need to be used for different drivable head portions.

Figure 9:
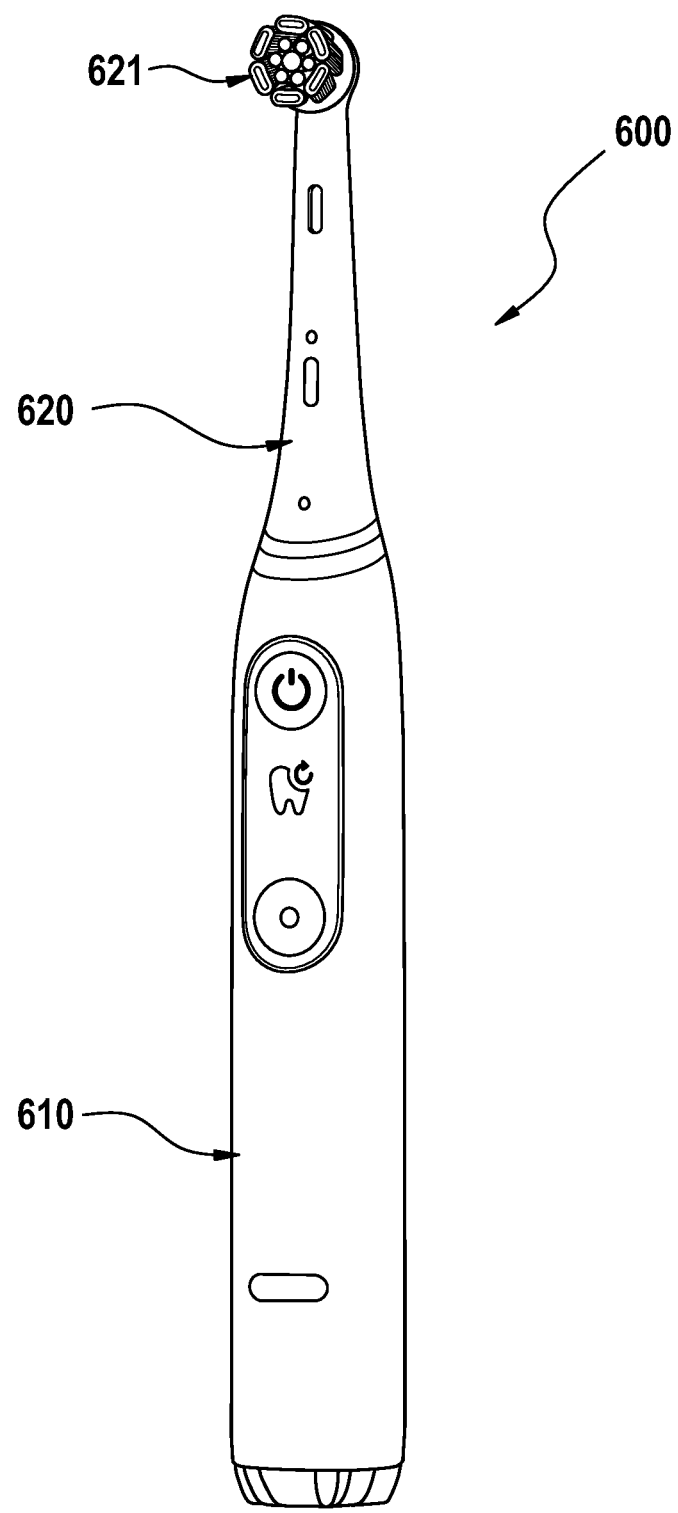
FIG. 9 is a depiction of a personal care device in which a motor unit as disclosed is used.

FIG. 9 is a depiction of an example personal care device 600, here realized as an electric toothbrush. The personal care device 600 comprises a handpiece 610 and a head 620 for applying a care procedure such as brushing teeth. A motor unit housed in the handpiece 610 is arranged to drive a movable head part 621 into motion. In operation, the movable head part 621 will be pushed against a body portion and thus load is applied at the motor of the motor unit. As was already explained, such a load may lead to a reduction in the deflection amplitude of the movable head part 621 and as was explained, the motor unit can measure the applied load and can apply an adapted amount of energy at the motor to essentially maintain a constant deflection amplitude. It shall not be excluded that the complete head 620 realizes the movable head part 621.

Figure 10:
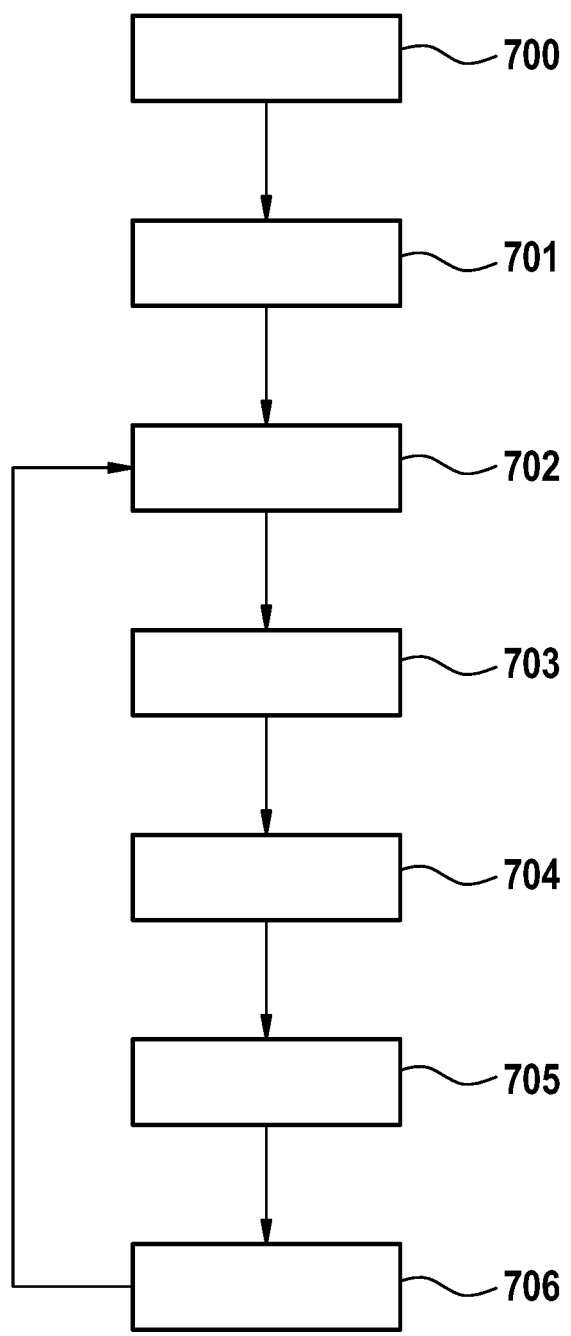
FIG. 10 is a flow diagram for a method of controlling a motor unit in accordance with the present disclosure.

FIG. 10 is a diagram relating to a method of controlling a motor unit, such as a motor unit of a personal care device, having a plurality of steps.

At step 700 a motor having a stator and an armature arranged for relative driven motion with respect to the stator is provided. At step 701 a set power level is supplied at the motor to drive the armature into motion. A pulse-width modulation may be used to supply a supply voltage at the motor. A step 702 the motor is dynamically braked during a braking time interval. At step 703 a value of a physical variable indicative of a current flow through the motor is measured within the braking time interval. At step 704 the value of the physical variable is compared with a target value, which target value depends on the set power level and an intended amplitude of the motion of the armature. At step 705 a new set power level in dependence on the comparison result is determined. And at step 706 the new set power level is provided to the motor after the end of the dynamic braking interval. The method then repeats starting with step 702 until the loop is interrupted, e.g., as the device in which the method is used is switched off.

The method may comprise a step of calibrating the target value by assuming a linear relationship of the set power level at a constant amplitude of the armature and the measured value of the physical variable.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A motor unit comprising:
a motor having a stator and an armature, the armature being arranged for relative driven motion with respect to the stator; and
a motor control unit having a supply circuit for providing a supply voltage at the motor to provide a set power level to the motor for driving the armature into motion; and
a measurement circuit for measuring a value of a physical variable that is indicative of a current flow through the motor;
wherein the motor control unit is arranged to interrupt the provision of the supply voltage by the supply circuit and to dynamically brake the motor during a braking time interval and further to measure the value of the physical variable during the braking time interval;
wherein the motor control unit is further arranged to compare the measured value of the physical variable with a target value, which target value depends on the supplied power level and on an intended motion amplitude of the armature, to determine a new set power level in dependence on the comparison result and to subsequently provide the new set power level to the motor.

2. The motor unit of claim 1, wherein the motor control unit is arranged to set the new set power level to be higher than the set power level in case the comparison result indicates that a load on the motor was increased and to set the new set power level to be lower than the set power level in case the comparison result indicates that a load on the motor was decreased.

3. The motor unit of claim 1, wherein the motor control unit is arranged to increase or decrease the new set power level relative to the set power level by an incremental value.

4. The motor unit of claim 1, wherein the motor control unit is arranged to set the new set power level to the set power level in case the comparison result indicates that a change of the load on the motor is below a threshold value.

5. The motor unit of claim 1, wherein the motor control unit is arranged to measure the value of the physical variable at a fixed time instance within the braking time interval.

6. The motor unit of claim 1, wherein the motor control unit is arranged to repeatedly measure the value of the physical variable and to determine a new set power level, where the previous new set power level becomes the set power level.

7. The motor unit of claim 1, wherein the motor control unit is arranged to set the new set power level so that a change in a load applied at the motor is at least partially compensated and so that an amplitude of the armature resulting from the new set power level is closer to the intended amplitude of the armature than at the set power level.

8. The motor unit of claim 1, wherein the motor control unit is arranged to control the provision of the supply voltage in a periodic manner, wherein the supply voltage is provided with a periodically changing polarity.

9. The motor unit of claim 1, wherein the measurement circuit comprises at least one pull-up or pull-down resistor.

10. The motor unit of claim 1, wherein the motor control unit is arranged to modify the target value in dependence on a value of the supply voltage.

11. The motor unit of claim 1, wherein the motor control unit is arranged to determine the value of the physical variable by controlling the measurement circuit to sample a current or voltage signal of the motor at a plurality of times within the braking time interval and to average or otherwise combine the plurality of sampled signals.

12. The motor unit of claim 1, wherein the motor control circuit is arranged to control the motor supply circuit so that the supply voltage is provided at the motor by means of a pulsed width modulation signal, wherein the frequency of the pulsed width modulation signal is higher than a frequency of a periodic provision of the supply voltage.

13. A personal care device comprising the motor unit of one of claim 1, wherein the personal care device comprises a personal care head that is arranged for driven motion.

14. A method of controlling a motor unit of a personal care device, comprising the steps of:
providing a motor having a stator and an armature arranged for relative driven motion with respect to the stator;
supplying a set power level at the motor to drive the armature into motion, by supplying a pulse-width modulated supply voltage at the motor;
dynamically braking the motor during a braking time interval;
measuring a value of a physical variable indicative of a current flow through the motor within the braking time interval;
comparing the value of the physical variable with a target value, which target value depends on the set power level and an intended amplitude of the motion of the armature;
determining a new set power level in dependence on the comparison result; and
subsequently providing the new set power level to the motor.

15. The method of claim 14, further comprising the step of calibrating the target value by assuming a linear relationship of the set power level at a constant amplitude of the armature and the measured value of the physical variable.

* * * * *